(12) United States Patent
Omar et al.

(10) Patent No.: US 7,590,759 B2
(45) Date of Patent: Sep. 15, 2009

(54) SYSTEM AND METHOD FOR PROVIDING REMOTE DATA ACCESS AND TRASCODING FOR A MOBILE COMMUNICATION DEVICE

(75) Inventors: Salim H. Omar, Waterloo (CA); Russell N. Owen, Waterloo (CA); Herbert A. Little, Waterloo (CA); Tomasz K. Rybak, Waterloo (CA); Michael S. Brown, Waterloo (CA); David P. Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 622 days.

(21) Appl. No.: 10/483,457

(22) PCT Filed: Jul. 12, 2002

(86) PCT No.: PCT/CA02/01073
§ 371 (c)(1),
(2), (4) Date: Jan. 8, 2004

(87) PCT Pub. No.: WO03/007183
PCT Pub. Date: Jan. 23, 2003

(65) Prior Publication Data
US 2004/0166834 A1    Aug. 26, 2004

Related U.S. Application Data

(60) Provisional application No. 60/305,044, filed on Jul. 12, 2001, provisional application No. 60/327,752, filed on Oct. 9, 2001, provisional application No. 60/330,604, filed on Oct. 25, 2001, provisional application No. 60/340,839, filed on Dec. 19, 2001.

(51) Int. Cl.
| | |
|---|---|
| G06F 15/16 | (2006.01) |
| G06F 17/27 | (2006.01) |
| G06F 17/28 | (2006.01) |
| G06F 3/14 | (2006.01) |
| H04L 12/28 | (2006.01) |
| H04L 12/56 | (2006.01) |
| H04M 1/64 | (2006.01) |

(52) U.S. Cl. .............. 709/246; 709/203; 709/218; 709/219; 709/249; 370/395.5; 379/88.17; 715/239; 715/760; 715/864

(58) Field of Classification Search ............... 709/203, 709/217–219, 246, 249; 707/10, 104.1; 370/312, 370/395.5; 379/88.17; 715/513–516, 760, 715/864
See application file for complete search history.

(56) References Cited

U.S. PATENT DOCUMENTS 6,216,157 B1    4/2001    Vishwanath et al.
(Continued)

FOREIGN PATENT DOCUMENTS

| EP | 0992922 | 4/2000 |
| WO | 9843177 | 10/1998 |

OTHER PUBLICATIONS

Rao, Chung-Hwa Herman, et al. "iMobile: A Proxy-Based Platform for Mobile Services," Proceedings of the 1$^{st}$ Workshop on Wireless Mobile Internet, 2001, pp. 3-10.*
(Continued)

*Primary Examiner*—Larry D Donaghue
*Assistant Examiner*—Melvin H Pollack
(74) *Attorney, Agent, or Firm*—Jones Day; Krishna K. Pathiyal; Robert C. Liang

(57) ABSTRACT

A system for providing information content over a network to a mobile communication device includes a transcoding system and a first network device. The transcoding system includes a plurality of transcoders. Each transcoder is operable to transcode the information content from a respective input content type into a respective output content type. The first network device is in communication with the transcoding system and includes a connection handler system. The first network device is operable to receive a first connection request that includes transcoder request data and to select a corresponding connection handler. The connection handler is operable to select one or more transcoders from the plurality of transcoders based on the transcoder request data.

42 Claims, 11 Drawing Sheets

U.S. PATENT DOCUMENTS

| | | | |
|---|---|---|---|
| 6,345,279 B1* | 2/2002 | Li et al. | 707/104.1 |
| 6,407,680 B1* | 6/2002 | Lai et al. | 341/50 |
| 6,823,373 B1* | 11/2004 | Pancha et al. | 709/219 |
| 6,842,777 B1* | 1/2005 | Tuli | 709/217 |
| 6,925,595 B1* | 8/2005 | Whitledge et al. | 715/513 |
| 6,941,382 B1* | 9/2005 | Tuli | 709/247 |
| 6,981,045 B1* | 12/2005 | Brooks | 709/226 |
| 6,993,476 B1* | 1/2006 | Dutta et al. | 704/9 |
| 7,003,584 B1* | 2/2006 | Floyd et al. | 709/246 |
| 7,013,322 B2* | 3/2006 | Lahr | 709/201 |
| 7,047,033 B2* | 5/2006 | Wyler | 455/552.1 |
| 7,072,984 B1* | 7/2006 | Polonsky et al. | 709/246 |
| 7,120,702 B2* | 10/2006 | Huang et al. | 709/246 |
| 7,134,073 B1* | 11/2006 | Fiedorowicz et al. | 715/513 |
| 7,145,898 B1* | 12/2006 | Elliott | 370/352 |
| 7,149,772 B1* | 12/2006 | Kalavade | 709/203 |
| 7,181,441 B2* | 2/2007 | Mandato et al. | 707/3 |
| 7,197,531 B2* | 3/2007 | Anderson | 709/203 |
| 7,225,238 B1* | 5/2007 | Dantu et al. | 709/219 |
| 2001/0054087 A1* | 12/2001 | Flom et al. | 709/218 |
| 2002/0103933 A1* | 8/2002 | Garon et al. | 709/246 |
| 2002/0116533 A1* | 8/2002 | Holliman et al. | 709/246 |
| 2002/0133569 A1* | 9/2002 | Huang et al. | 709/219 |
| 2002/0165926 A1* | 11/2002 | Rensin et al. | 709/213 |
| 2002/0169823 A1* | 11/2002 | Coulombe et al. | 709/203 |
| 2002/0174147 A1* | 11/2002 | Wang et al. | 707/513 |
| 2002/0198964 A1* | 12/2002 | Fukazawa et al. | 709/219 |
| 2003/0014531 A1* | 1/2003 | Bodin et al. | 709/231 |

OTHER PUBLICATIONS

Chandra, Surendar et al. "Multimedia Web Services for Mobile Clients Using Quality Aware Transcoding," Proceedings of the $2^{nd}$ ACM Intl. Workshop on Wireless Mobile Multimedia, 1999, pp. 99-108.*

Han, Richard et al. "Dynamic Adaptation in an Image Transcoding Proxy for Mobile Web Browsing," IEEE Personal Communications, vol. 5, Issue 6, Dec. 1998, pp. 8-17.*

Bharadvaj, Harini et al. "An Active Transcoding Proxy to Support Mobile Web Access," Proceedings on the $17^{th}$ IEEE Symposium on Reliable Distributed Systems, Oct. 23, 1998, pp. 118-123.*

Klyne, G. "Protocol-Independent Content Negotiation Framework," RFC 2703, Sep. 1999, pp. 1-20.*

Greene, N. et al. "Media Gateway Control Protocol Architecture and Requirements," RFC 2805, Apr. 2000, pp. 1-45.*

Mitzel, D. "Overview of 2000 IAB Wireless Internetworking Workshop," RFC 3002, Dec. 2000, pp. 1-42.*

Agarwal, A. et al. "Dacom 450/500 Facsimile Data Transcoding," RFC 803, Nov. 1981, pp. 1-14.*

Klyne, Graham: "CC/PP Attribute Vocabularies" W3C Working Draft [Online] Jul. 21, 2000, pp. 1-34, XP002218349, Retrieved from the Internet on Oct. 24, 2002 at <URL:http://www.w3.org/TR/200/WD-CCPP-vocab-20000721>.

Fielding, et al.: "RFC 2616 HTTP/1.1" Request for Comments, Jun. 1999, Standards Track, pp. 62-92, XP002218350.

Mogul, J.C., "Server-Directed Transcoding," Computer Communications, Elsevier Science B.V., Amsterdam, NL, vol. 24, No. 2, Feb. 1, 2001, pp. 155-162.

* cited by examiner

SYSTEM AND METHOD FOR PROVIDING REMOTE DATA ACCESS AND TRASCODING FOR A MOBILE COMMUNICATION DEVICE

This application claims benefit of the following U.S. Provisional Applications: Ser. No. 60/305,044, entitled "System And Method For Providing Remote Data Access For A Mobile Communication Device" and filed on Jul. 12, 2001; Ser. No. 60/327,752, entitled "System and Method For Providing Remote Data Access To A Mobile Communication Device" and filed Oct. 9, 2001; Ser. No. 60/330,604, entitled "System And Method For Providing Remote Data Access And Transcoding For A Mobile Communication Device" and filed Oct. 25, 2001; and Ser. No. 60/340,839, entitled "System And Method For Pushing Data From An Information Source To A Mobile Communication Device" and filed Dec. 19, 2001. The complete disclosure of all the above-identified provisional applications are hereby incorporated into this application by reference.

CROSS REFERENCE TO RELATED APPLICATIONS

This application is also related to the following co-pending Non-Provisional Applications: Ser. No. 10/483,449 entitled "System And Method For Providing Remote Data Access For A Mobile Communication Device" and filed on Jan. 8, 2004 which is a 35 U.S.C. 371 filing of PCT/CA02/01072 filed on Jul. 12, 2002; and Ser. No. 10/483,116 entitled "System And Method For Pushing Data From An Information Source To A Mobile Communication Device" and filed on Jan. 7, 2004 which is a 35 U.S.C. 371 filing of PCT/CA02/01074 filed Jul. 12, 2002, the complete disclosures of which are hereby incorporated into this application by reference.

BACKGROUND

1. Field of the Invention

This invention relates generally to mobile communications, and in particular to providing access to remote data from mobile communication devices.

2. Description of the State of the Art

Known solutions for providing remote access to data using mobile communication devices tend to be relatively limited. For example, Wireless Application Protocol (WAP) browsers for mobile devices typically provide access only to information associated with WAP-compliant sources. Although other known and similar products may allow a mobile device user to access further information sources, such products generally do not make efficient use of mobile communication network resources, particularly wireless communication links, and often require processor-intensive operations such as information parsing to be executed on the device.

Furthermore, most known data access systems and methods are not is suited to provide truly secure access to confidential information stored on private networks, such as corporate information located on a data store behind a security firewall.

SUMMARY

The instant application describes a system and method for providing mobile communication devices with access to remote information sources. A system and method for providing secure access to confidential information is also described.

The systems and methods described herein provide for access to any of a plurality of types and formats of information. Particular information translation operations may be selected by either a mobile communication device or an information source and performed on an information source side of a mobile communication system. This not only reduces the complexity of device processing operations and any device hardware and software components associated with such operations, but also provides for customized device information formats.

In one embodiment, a system for providing information content over a network to a mobile communication device includes a transcoding system and a first network device. The transcoding system includes a plurality of transcoders. Each transcoder is operable to transcode the information content from a respective input content type into a respective output content type. The first network device is in communication with the transcoding system and includes a connection handler system. The first network device is operable to receive a first connection request that includes transcoder request data and to select a corresponding connection handler. The connection handler is operable to select one or more transcoders from the plurality of transcoders based on the transcoder request data.

DETAILED DESCRIPTION

General System Description

Figure 1:
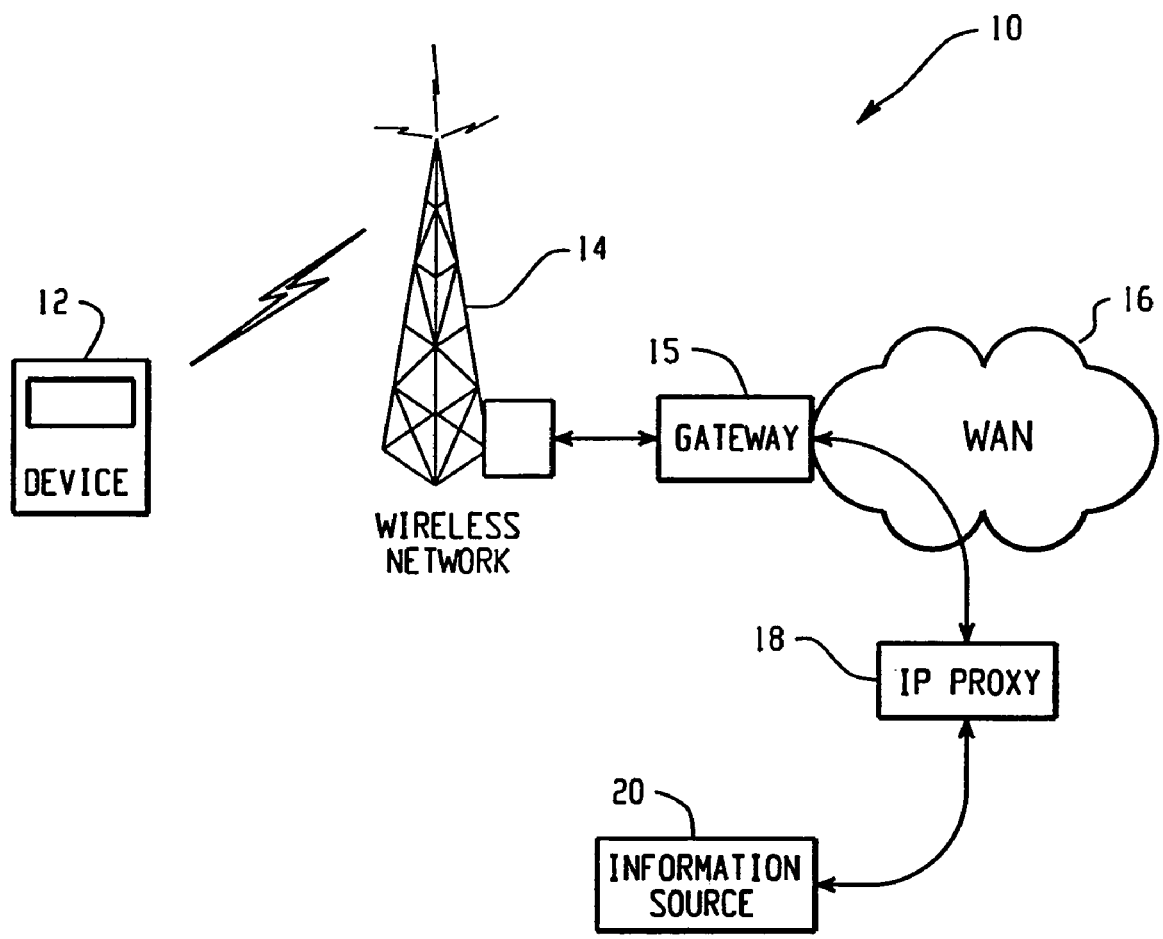
FIG. 1 is a general block diagram of a communication system that provides access to a remote information source from a mobile communication device.

FIG. 1 is a general block diagram of a communication system that provides access to a remote information source 20 from a wireless mobile communication device ("mobile device") 12. In FIG. 1, the system 10 includes a mobile device 12, a wireless network 14, a gateway 15, a wide area network (WAN) 16, an Internet Protocol (IP) Proxy system 18, and an information source 20. Although an IP Proxy system 18 is shown in the illustrative example system of FIG. 1, proxy systems for protocols other than IP may be implemented in accordance with the present invention. Protocols at other levels within the Open Systems Interconnection (OSI) model can also be proxied using this system. Such other protocols include but are not limited to Hypertext Transfer Protocol (HTTP) and Transmission Control Protocol (TCP).

The mobile device 12 may be any mobile device adapted to operate within a wireless communication network 14, and is preferably a two-way communication device. The mobile device 12 may have voice and data communication capabilities. Depending on the functionality provided by the mobile device 12, the mobile device 12 may be referred to as a data messaging device, a two-way pager, a cellular telephone with data messaging capabilities, a wireless Internet appliance or a data communication device (with or without telephony capabilities). As will be apparent to those skilled in the field of communications, the particular design of a communication subsystem within the mobile device 12 will be dependent upon the communication network 14 in which the mobile device 12 is intended to operate. For example, a mobile device 12 destined for a North American market may include a communication subsystem designed to operate within the Mobitex™ mobile communication system or DataTAC™ mobile communication system, whereas a mobile device 12 intended for use in Europe may incorporate a General Packet Radio Service (GPRS) communication subsystem. Those skilled in the art will also appreciate that other types of mobile devices and networks are also contemplated. The inventive systems and methods described herein may be implemented in conjunction with virtually any wireless network 14.

The gateway 15 shown in FIG. 1 provides an interface between the wireless network 14 and a WAN 16, which may, for example, be the Internet. Such functions as mobile device addressing, conversion of data between WAN protocols and wireless network protocols, storing and forwarding data to and from the mobile device 12, and other interface functions may be performed by the gateway 15.

It is also possible that an IP Proxy system 18 could be hosted by a network carrier/operator associated with the wireless network 14. In this case, the connection between the IP Proxy system 18 and the gateway 15 would use a private network of the carrier instead of the WAN 16. The WAN could then be used to communicate between the IP Proxy system 18 and the information source 20.

The IP Proxy system 18 is a system that effectively provides the mobile device 12 with access to the information source 20 and is described in further detail below. Through the IP Proxy system 18, the mobile device 12 may access any information source 20, such as an Internet or web server, that can communicate with the IP Proxy system 18. The information source 20 therefore requires no special applications or protocol support for wireless network communications, since it communicates with the IP Proxy system 18 and not directly with the mobile device 12. Although shown in FIG. 1 as a direct connection, the IP Proxy system 18 and information source 20 may also communicate through a network such as a local area network (LAN) or WAN, including the Internet.

Wireless networks and the Internet use similar addressing schemes, in which recipients, such as mobile devices in a wireless network or Internet-connected computers, are identified by numerical addresses. For example, mobile devices are identified in the Mobitex network using Mobitex Access Number (MAN) and public Internet nodes are identified using an IP address scheme. However, differences between wireless network and Internet transport mechanisms prevent direct communication between information sources 20, the vast majority of which are Internet-based, and mobile devices 12. Furthermore, information source content is largely targeted to desktop or other computer systems with relatively powerful processors and may require that processor-intensive operations such as information parsing be performed by a recipient. Since mobile devices tend to have less powerful processors, these operations take more time on such mobile devices than on computer systems and can consume significant amounts of power from normally limited-power sources. The IP Proxy system 18 bridges the gap between Internet-based and possibly other information sources 20 and a wireless network 14 with associated mobile devices 12. The services supported by the IP Proxy system 18 may include address mapping, content transformation and verification, and protocol mapping and optimisation, for example.

Detailed Description of the IP Proxy System

Figure 2:
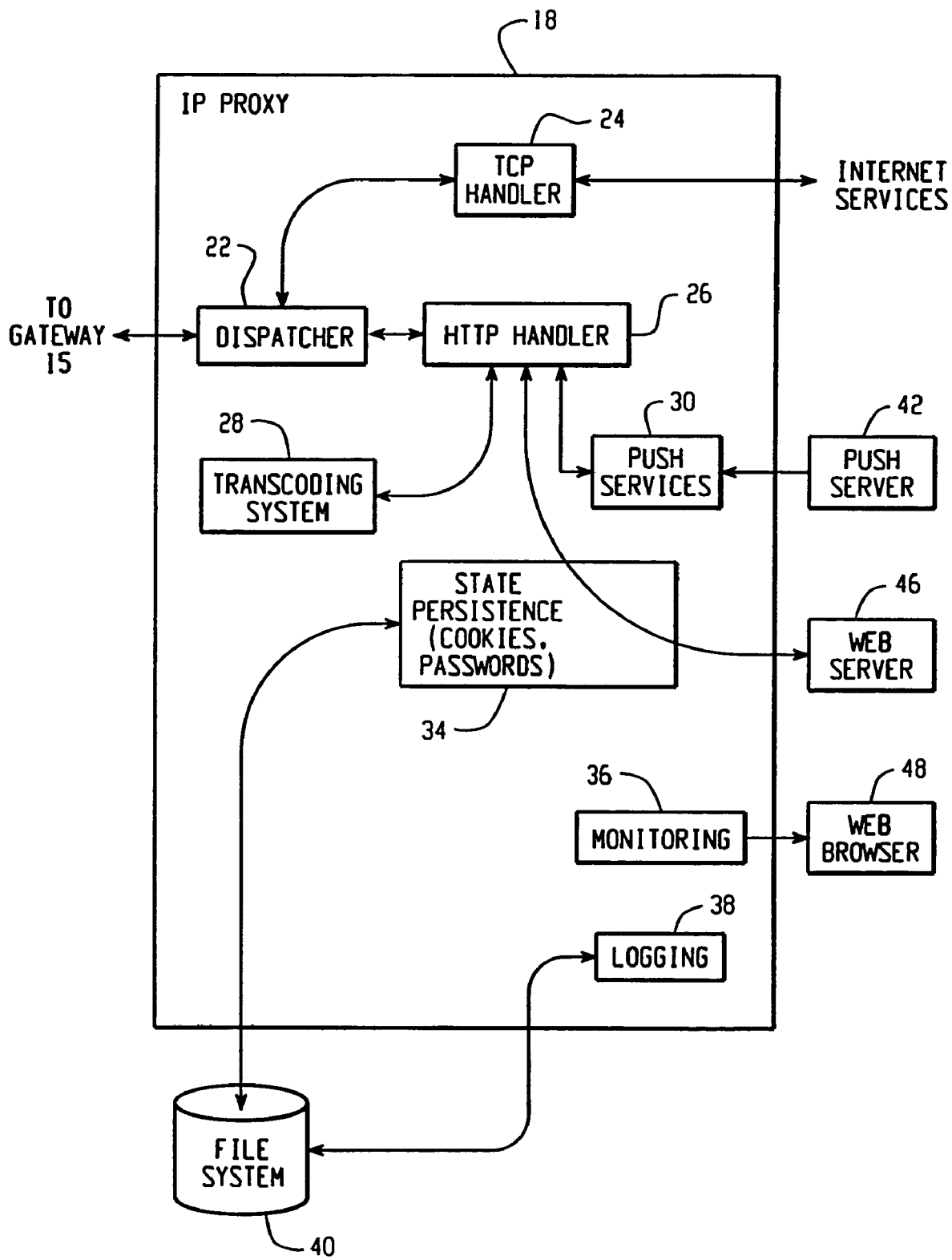
FIG. 2 is a more detailed block diagram of the system shown in FIG. 1.

FIG. 2 is a more detailed block diagram of the IP Proxy system 18 shown in FIG. 1. The IP Proxy system 18 may include a dispatcher 22, a TCP handler 24, an HTTP handler 26, a transcoding system 28, one or more push services generally designated 30, a state persistence element 34, a monitoring system 36, and a logging system 38. FIG. 2 also shows a push server 42, a web server 46, a web browser 48, and a file system 40, with which the IP Proxy system 18 may interact from time to time. Many of the components shown in FIG. 2 may be implemented primarily as computer software modules. Elements within the IP Proxy system 18 will typically be running on the same computer, whereas components external to the IP Proxy system 18 are normally resident on separate computers. In another embodiment, however, the elements of the IP Proxy system 18 may instead be distributed among a group of computers distributed over a network.

Dispatcher 22 manages data flows and the connection to the gateway 15. Depending on the type of connection or the type of data being transferred or data transaction being performed for example, the dispatcher 22 interacts with the TCP handler 24 or the HTTP handler 26. The transcoding system 28 comprises one or more data filters, each of which converts data or other information from one format into a format that can be processed by a mobile device 12.

Push services 30 provide for transfer of "unsolicited" information from an information source such as push server 42, which may for example be a web server or a software application, to a mobile device 12 through the IP Proxy system 18. The push services component 30 allows the push server 42 to address the mobile device 12 using for example the email address of the mobile device owner or some other convenient label. Accordingly, the push server 42 need not know the address of the mobile device 12 in the wireless network 14. The state persistence element 34, in conjunction with a data file system 40 or a database, enables management of cookies, passwords and possibly other state information associated with web servers 46 to which the IP Proxy system 18 may connect. It preferably stores state information about a connection that persists between discrete network packets, such as an HTTP request/response pair. The monitoring system 36 allows remote monitoring of the performance, efficiency, usage and health of an IP Proxy system 18 by an administrator through an interface such as a web browser 48. As its name implies, the logging system 38 may be configured to store usage, connection, user statistics and the like to the file system 40 or some other secondary storage.

Connections and Handlers

The IP Proxy system 18 can preferably handle and process content from various information sources 20, including Internet-based sources. This functionality is provided by connection handlers, which are intermediate objects that have the ability to process content from inbound and outbound connections to an IP Proxy system 18. In the IP Proxy system 18 shown in FIG. 2, two such handlers, the TCP handler 24 and the HTTP handler 26, are shown. These handlers can preferably be replaced and customized or additional handlers can preferably be added to an IP Proxy system 18 as needed. The connection handlers can optimise not just the content but also the protocol. For example, some requests that would normally be sent to the mobile device (such as a request for a password) may be resolved by the connection handler, where requested data has been stored in the file system 40 or another store accessible to the connection handler, through the state persistence element 34, for example. This instance of a protocol optimisation can adapt so-called "chatty" protocols to be more wireless friendly by reducing the amount of traffic sent over a wireless network to a mobile device, thereby reducing the effects of wireless network bandwidth constraints and latency.

Outbound connections would be made from mobile devices 12 in order to send data to and receive data from other entities such as Internet nodes. The IP Proxy system 18 preferably receives connection requests from mobile devices 12 using a particular protocol, such as a proprietary protocol called IP Proxy Protocol or IPPP developed by the assignee of the present application. Other protocols might also be used. The IP Proxy system 18 then establishes an Internet connection, according to routing information provided by the mobile device 12, and translates and maps that connection to start forwarding data in both directions. A filtering or transcoding process is invoked whenever necessary, based on the type of content being passed over the connection, or based on a particular transcoding process specified in the connection request from the mobile device 12, for example. Such outbound connections will be described in further detail below, in the context of web browsing operations.

Inbound connections are used, for example, to implement a data push model. In this model, a mobile device 12 may be sent information without having issued requests to fetch the information, as is the case with outbound connections. As described briefly above, mobile devices 12 may exist on a different network domain than Internet nodes. The IP Proxy system 18 is responsible for bridging the Internet and wireless network domains. Thus, the IP Proxy system 18 requires certain routing information to route the traffic to a particular mobile device 12. In a push operation, at least some of this routing information must be provided by the Internet node, such as the push server 42, that issues the request to establish an inbound connection. The IP Proxy system 18 may convert commonly known addressing schemes such as email or IP numbers into the appropriate wireless network address of an intended recipient mobile device 12. In another embodiment, a transcoding process for pushed content may be selected and specified by a push server 12 or information source 20.

Connection handlers in an IP Proxy system 18 are stream-based objects. When an outbound or inbound connection is requested, a virtual piped stream is established between mobile device 12 and the appropriate connection handler. The connection handler will be instantiated and started to process the content for the established connection. Loading the connection handler is based on a connection request, which preferably contains a reference to appropriate handler name that implies the type of the traffic that would normally go through the virtual piped stream and the location of the handler that must be loaded if is not already loaded. The functions of connection handlers include mapping Internet or other information source-side connections and mobile device-side connections, forwarding traffic between these connections, and loading and invoking the appropriate transcoders on information destined for a mobile device 12.

Every connection is preferably associated with an instance of a connection handler. This is true even for a connection that does not require that content be processed by the IP Proxy system 18, such as a pure TCP connection between a mobile device 12 and a server. This type of connection handler forwards content back and forward without making any sort of modification to the content, although it may make modifications to the protocol. For clarity, those skilled in the art will appreciate the distinction between the data or content (what the mobile device requested or is being sent) and the protocol (the "wrappers" and conversions required to deliver the data).

Connection handlers are also responsible for loading the appropriate content filters or transcoders. According to one embodiment, a connection handler such as the HTTP connection handler 26 uses a particular transcoder in the transcoder system 28 specified by either the mobile device 12 or an information source such as push server 42 or web server 46.

Figure 3:
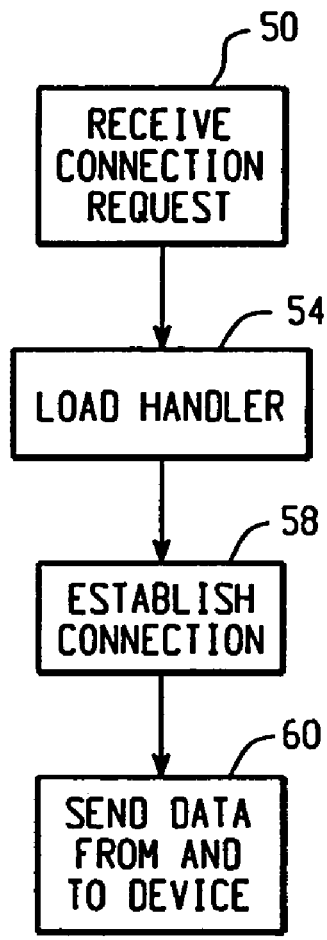
FIG. 3 is a flow chart representing general connection handler-related operations in the system.

FIG. 3 is a flow chart representing general connection handler-related operations in an IP Proxy system. At step 50, the IP Proxy system 18 receives a connection request, which as described above may relate to an inbound connection or an outbound connection. When the connection is associated with a particular handler, such as an HTTP connection that requires HTTP connection handler 26, the appropriate handler is loaded and executed at step 54 and the connection is established, as indicated at step 58. If the request is outbound (from the mobile device 12), then the dispatcher 22 examines the protocol type associated with the request and delegates the connection to the appropriate handler. Data may then be exchanged between a mobile device 12 and an Internet service, push server 42, web server 46 or other information source 20.

Figure 4:
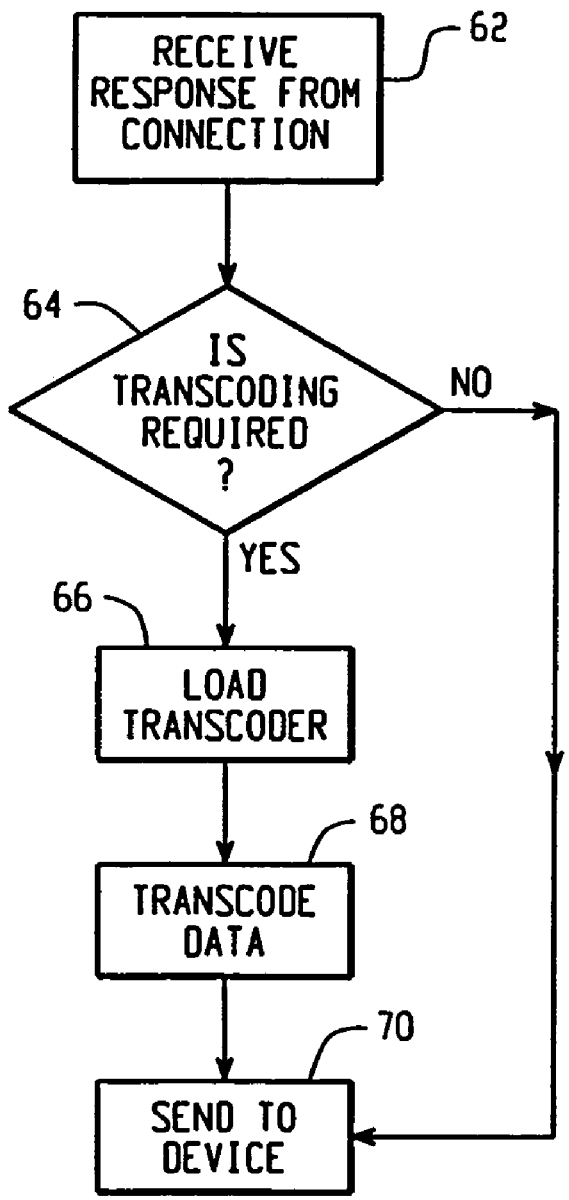
FIG. 4 is a flow chart of connection handler data processing operations.

If certain connection handlers are used for a connection, such as for a pure TCP connection as described above, then the data may pass through the IP Proxy system 18 unchanged. In some IP Proxy systems however, content sent over a TCP handler may be modified. When other connection handlers are used however, data destined for a mobile device 12 may need to be converted into a suitable format. FIG. 4 is a flow chart of connection handler data processing operations. At step 62, data destined for a mobile device 12 is received. Although labelled as a response from a connection, following an information request from a mobile device 12, for example, it will be understood that data received by the connection handler may instead be information to be pushed to the mobile device 12 from a push server such as 42 via push service 30. The connection handler determines at step 64 if transcoding is required. If not, then the information is sent to the mobile device at step 70. Otherwise, the appropriate transcoder is loaded and executed as shown in step 66, and the data is transcoded into an acceptable format as shown in step 68, before being sent to the mobile device 12. In one embodiment, the entity that initiates the communication, the mobile device for fetched data or the push server 42 for pushed data, can specify a particular transcoder to do the transcoding of the fetched or pushed data, as described in more detail below.

A connection handler may be implemented in computer software as a Java™ class file, placed in a certain directory in a file system such that an IP Proxy system Java Virtual Machine (VM) may locate and load the file when needed or requested. As those skilled in the art will appreciate, Java uses CLASSPATH environment variable as a guide to where it should perform a lookup for user defined classes. In one embodiment, the paths to connection handlers are among the first listed paths in the CLASSPATH so that they are loaded relatively quickly when requested. The connection direction (inbound or outbound) and the name associated with a connection handler may also play a role in defining the full class name of a handler. Another embodiment utilizes dynamic linked libraries (DLLs) or dynamic shared objects (DSOs) depending on the target operating system.

Most connection handlers will normally be associated with a name that represents a protocol at the application layer. For example, if a mobile device 12 is enabled with a web browser and may therefore request to open connection to an Internet server such as 46, it would be appropriate to have HTTP as a name for that connection handler, illustratively HTTP connection handler 26. In one embodiment, the handler name adheres to the known rules of naming packages in Java language. Preferably, the handler name is in lower case; however, from an IP Proxy system point of view, naming convention does not matter, provided the Java VM can load that connection handler. Any Connection Handler may also have its class name as Handler.class. An example of a Valid full class name that represents a connection handler is as follows:

net.rim.protocol.iplayer.connection.handler.<connection
        direction>.<connection handler
        name>.Handler.class where connection direction can be either device, which implies outbound connection, or server, which implies inbound connection. Connection handler name is the name associated with the handler, for instance, http, ftp, etc.

There are at least two ways that an information source such as an Internet node can establish a connection to a mobile device through the example IP Proxy system 18 shown in FIG. 2: (1) using a transportation layer protocol directly, such as TCP, to open a direct connection to the IP Proxy system 18, or (2) using a datagram protocol at the application layer, such as HTTP. The IP Proxy system 18 includes two corresponding connection handlers, which may, for example, represent a basic IP Proxy system that can process two of the most common types of connection. The first is the TCP connection handler 24, associated for example with the name tcp. The second is the HTTP connection handler 26, which may similarly be associated with the name http, as described above. In addition to supporting common connection types, these connection handlers may also satisfy requirements for Mobile Information Device Profile (MIDP) implementation at the mobile device 12. However, the IP Proxy system 18 and the mobile device 12 can be extended to support any other types of connections. In the IP Proxy system 18, connection handlers may possibly be added by providing an application programming interface (API) in the IP Proxy system 18 and developing new connection handlers that adhere to the API, for example.

In one embodiment, the IP Proxy System 18 includes connection handlers that are loaded from a local storage medium, for example a disk drive associated with a computer on which IP Proxy system software is running. In another embodiment, the connection handler storage may also or instead be remote from the IP Proxy system 18, such as in a storage medium accessible by the IP Proxy system 18 through a LAN connection or even a WAN like the Internet. This allows sharing of a single directory of connection handlers among all IP Proxy systems 18 that can communicate with the connection handler store. It would also be possible to have third parties extend the connection handler set by embedding the URL where the connection handler java class can be found.

If connected to the Internet, a connection handler directory could potentially be accessed and thus shared by all Internet-connected IP Proxy systems 18. Public Internet-connected connection handler directories would preferably receive connection handler requests from IP Proxy systems and in response transmit any requested connection handlers to the requesting IP Proxy system 18. A new connection handler may be required by an IP Proxy system 18 when a mobile device 12 which communicates with the IP Proxy system 18 downloads a new software application or invokes a new mobile device feature which uses a new connection scheme or a connection method that was not previously used by the mobile device 12. A mobile device user or the new application or feature may then send a control message to the IP Proxy system 18, indicating for example the name of the required connection handler, perhaps the mobile device application that requires the new connection handler and an address associated with a connection handler directory from which the new connection handler may be requested. The IP Proxy system 18 would then preferably request the new connection handler from the directory. A connection handler directory could be implemented for example as a web server accessible to an IP Proxy system 18 using HTTP requests.

When a connection handler is loaded from a remote source, the IP Proxy system 18 preferably stores the handler in a local store in order to provide for faster loading of the handler for subsequent operations involving the corresponding type of connection for either the mobile device 12 for which the connection handler was initially loaded from the directory or a different mobile device 12 supported by the IP Proxy system 18. Depending upon the memory resources available to an IP Proxy system 18, downloaded connection handlers may be stored indefinitely or for a particular period of time. Alternatively, a least recently used or LRU replacement scheme could be used to provide for more efficient use of available memory by overwriting relatively less frequently used connection handlers when new handlers are downloaded. Other memory management techniques could also be used to optimize local IP Proxy system connection handler storage arrangements.

Transcoding

Relative to computer networks such as the Internet, wireless communication networks are slow. Any program that bridges the two, as an IP Proxy system does, may have to transform Internet data so that it is formatted appropriately for a wireless network and mobile device. This process is referred to herein as filtering or transcoding, and usually involves such operations as compressing data from the Internet into a more compact format appropriate for wireless transmission.

In the following description, transcoding operations are illustrated primarily in the context of the above example of an HTTP handler 26 and HTTP connection. The HTTP connection and handler example is particularly useful in that HTTP allows content tags in the form of Multipurpose Internet Mail Extension (MIME) types, which may be used in some embodiments to determine an appropriate transcoder for received information.

In an IP Proxy system 18, there may be a single configuration file for each type of connection handler. In the IP Proxy system 18 for example, a single configuration file associated with the HTTP connection handler 26 may include information for all HTTP content transcoders. This configuration file is used to map transcoders to certain keys. The IP Proxy system 18 may consult this file to determine which content transcoders are available to manipulate any received content destined for a mobile device 12.

In the configuration file, general rules are preferably specified for how to define the mapping between content types and transcoders. One example of a possible configuration file entry is as follows:

```
Entry = {[default] : { RSV | <Transcoder name>}} |
        { [[ InputType] | < ->OutputType> ] :   [ Transcoder name] }
``` where default indicates to the IP Proxy system which default transcoder should be loaded in case there is no one transcoder associated with a received content type or connection request;

RSV is a set of reserved keywords that is used in configuration file, such as pass (i.e. forward data to the mobile device without transcoding) or discard (i.e. do not transcode or forward data to the mobile device);

Transcoder name is the name of the mapped transcoder;

InputType indicates the input content type that the mapped transcoder can accept, which for an HTTP transcoder configuration file may be a MIME type; and OutputType indicates the output type, such as a MIME type for an HTTP transcoder that the transcoder can produce.

By using a content transcoder configuration file, new transcoders may be added for use by an IP Proxy system 18. Therefore, as new transcoders are developed and become available, they can be added to the configuration file for any appropriate connection handlers and can thereafter be loaded by a connection handler when required, and without affecting other components of the IP Proxy system 18. For example, configuration file entries may be added without shutting down the entire IP Proxy system 18, thus allowing dynamic expansion of data that can be converted for transmission to mobile devices 12.

In another embodiment, a common configuration file format for all connection handlers is used, and thus only a single configuration file entry need be prepared and can be added to the configuration file for any connection handler. The concept of a common configuration file format for all connection handlers can be further extended to providing a single configuration file for an IP Proxy system 18. Such a configuration file could then be used by all connection handlers in the IP Proxy system 18 to determine which content transcoders are available and to select a particular transcoder for received content. However, it should be understood that a common configuration file format is in no way required. Some connection handlers may share a configuration file entry format or even a single configuration file, whereas others supported by the same IP Proxy system 18 may have different configuration files and entry formats.

The IP Proxy system 18 preferably loads and executes a particular transcoder specified by either a mobile device or an information source to transcode data being either pushed to or pulled by a mobile device 12. Several illustrative example content transcoder loading control schemes are described in further detail below. Although these examples relate primarily to HTTP connections and handlers, other connection types and handlers may use similar arrangements and methods to select a transcoder.

It should also be appreciated that a transcoder may instead be selected based upon information other than content types, including information in a header portion or other portion of a connection request from a mobile device, a response to a connection request, or a communication from an information source including information to be pushed to a mobile device.

For example, an IP Proxy system 18 may be configured to determine a type of the mobile device 12 to which data is to be sent. Transcoder selection by the IP Proxy system 18 could similarly be based on a network address or other identifier of the mobile device 12. Mobile device- or device type-dependent transcoder selection schemes may be supported by providing a device or device type mapping table accessible to the IP Proxy system 18, which maps devices or device types to transcoders. Alternatively, a configuration file may be adapted to include device or device type identifiers to thereby associate particular transcoders with devices or device types.

In a similar manner, transcoders may be selected based on an address (such as a URL) or other identifier of an information source, to enable information source-specific transcoding. A mapping table or a configuration file accessible to an IP Proxy system such as 18, may be used to enable transcoder selection based on information source. This type of transcoder selection may be useful, for example, when a particular transcoder is to be used to transcode any content that originates from a specific website and is destined for a mobile device.

Although the primary type of transcoder selection scheme described below is based on a particular transcoder specified by a mobile device or information source, any of these alternative schemes may be used to select a transcoder, for example, when a specified transcoder is not available. If information content to be sent to a mobile device includes multiple content types, then these schemes may also be used to select a transcoder for one or more of the multiple content types.

Specifying a Content Transcoder from a Mobile Device

A connection request from a mobile device 12 may specify that a particular transcoder be used to transcode any content received in response to the request. For an HTTP connection for example, an IP Proxy system 18 may be configured to expect a Content-Transcoder field in an HTTP request header to indicate that a mobile device 12, or typically an application on the mobile device 12, is specifying a particular HTTP content transcoder. The IP Proxy system 18 will load and execute the specified transcoder to manipulate any response to the request. The active connection handler in the IP Proxy system 18, the HTTP connection handler 26, may also modify the request to include an indication, such as a MIME type, of the type of content that can be accepted in response to the request. The Content-Transcoder header field should have a value that is valid in the context of the HTTP configuration file, or where another connection handler is used, its corresponding configuration file.

If a requested transcoder is not available, then an error message will preferably be sent back to mobile device 12, for example in the form of an IOException indicating that the requested transcoder is not available. The mobile device application or user may then have the option to retry the request with a different transcoder. When the requested information is intended for a mobile device software application that requires information in a particular format available only from the specified transcoder however, the request may instead be retried at a later time when the specified transcoder may possibly be available.

Figure 5:
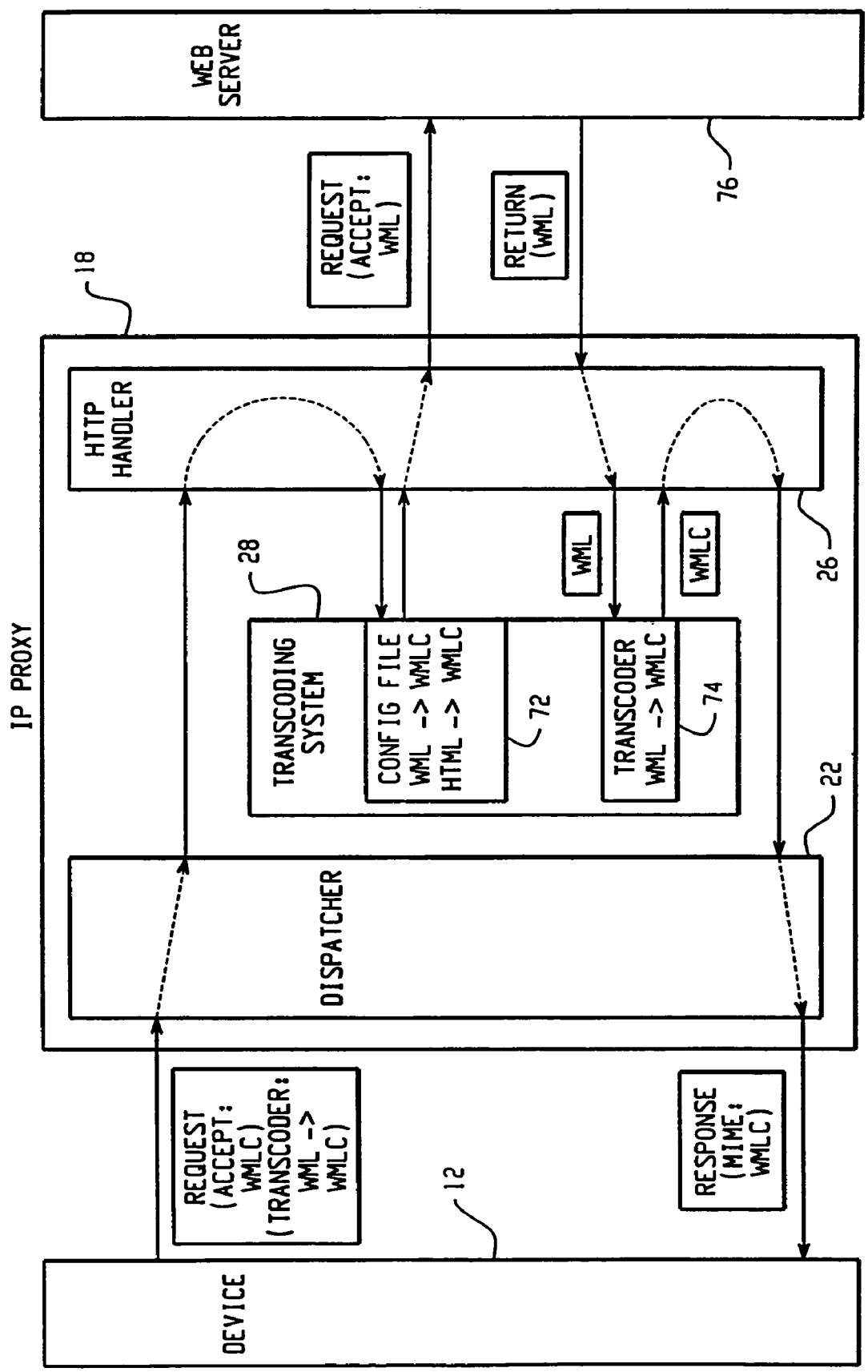
FIG. 5 is a signal flow diagram illustrating an example of device-controlled transcoder selection for an HTTP connection.

Transcoder selection in a mobile device information request will now be described in further detail by way of several illustrative examples of HTTP requests. FIG. 5 is a signal flow diagram illustrating an example of mobile device-controlled transcoder selection for an HTTP connection. Although FIG. 5 shows only those components of the IP Proxy system 18 directly involved in the example of an HTTP request from a mobile device 12, other system components may also be present. In order to avoid congestion in the drawings however, such components as 30 through 48 in FIG. 2 have not been shown in FIG. 5.

In FIG. 5, an HTTP request is sent from the mobile device 12, through a wireless network and possibly through a WAN and appropriate gateway to the IP Proxy system 18. As described above, the mobile device 12 may communicate with an IP Proxy system 18 using a protocol other than HTTP, such as the proprietary IPPP. In such arrangements, although the connection request conforms to a particular protocol, the request may specify a connection type or connection handler, HTTP in this example, associated with a different protocol. Therefore, references to HTTP requests sent from a mobile device 12 should be interpreted to include both HTTP requests, if mobile device to IP Proxy system communications are via HTTP, as well as connection requests which conform to other protocols but specify HTTP or HTTP connection handlers and thus are interpreted by an IP Proxy system 18 as HTTP requests.

The request from the mobile device 12 is received by the dispatcher 22, which interprets the request as an HTTP request and loads the HTTP handler 26. Preferably in a header field, such as the Content-Transcoder field referred to above, the request in this example specifies that a particular transcoder which converts from Wireless Markup Language (WML) content to a tokenized, compressed version of WML generally referred to as Compiled WML or simply WMLC, should be used to transcode any content received in response to the request. The request may also include an indication of the type of content, WMLC in FIG. 5, that the mobile device is configured to accept. Since the IP Proxy system 18 may determine or infer the content type(s) accepted by the mobile device 12 from the output type of the specified transcoder, accepted content types need not necessarily be specified in the request from the mobile device 12.

The example request shown in FIG. 5 specifies the particular transcoder in terms of its input content type (WML) and output content type (WMLC). However, other transcoder naming conventions are also possible. When a configuration file (72 in FIG. 5) has entries in a format as described above, part of the file entry for each transcoder indicates its respective input and output content types. The "Transcoder Name" field in such a configuration file entry therefore need not necessarily also include the input and output content types. Although many different transcoder naming schemes are possible, a particular transcoder is preferably specified in any mobile device requests and configuration files using the same name.

Regardless of the transcoder naming scheme, the HTTP handler 26 preferably uses the specified transcoder name, WML->WMLC in FIG. 5, to perform a lookup in the configuration file 72, shown in the transcoding system 28. It should be appreciated however, that the configuration file 72 might instead be external to the transcoding system 28, part of the HTTP handler 26, or even external to the IP Proxy system 18 provided that the HTTP handler 26 can access the file. In most implementations, the configuration file 72 will be stored in a data store accessible by the IP Proxy system 18, typically on the same computer system on which the IP Proxy system 18 is running.

The HTTP handler 26 searches the configuration file 72 to determine if the transcoder specified in the request is available in the IP Proxy system 18. Where the transcoder input content type is not inferable from the transcoder name or specified in the request from the mobile device 12 as in FIG. 5, the transcoder input content type is preferably available from the configuration file 72. In FIG. 5, the configuration file 72, which may, for example, be implemented as a lookup table, includes entries for two transcoders, the specified WML->WMLC transcoder and an HTML->WMLC transcoder. Since the WML->WMLC transcoder specified in the mobile device request has an entry in the configuration file 72 and is therefore available to the IP Proxy system 18, the HTTP handler 26 prepares an HTTP request including the input content type of the transcoder, WML, as an accepted content type and submits the HTTP request to the web server 76. If the specified transcoder is not available in the IP Proxy system 18, then the HTTP handler 26 returns an error message to the mobile device 12, through the dispatcher 22 or other protocol translator if necessary, indicating that the required transcoder is not available. Alternatively, the dispatcher 22 may perform the configuration file lookup operation and return the error message to the mobile device 12.

In response to an HTTP request from the IP Proxy system 18, the web server 76 returns requested content, in WML format in the example in FIG. 5, to the IP Proxy system 18. The HTTP handler 26 then determines that the returned content is WML, loads the WML->WMLC transcoder 74 specified in the mobile device request from a local store for example, and executes the transcoder to convert the received content into WMLC. The WMLC content is then forwarded to the mobile device 12, through the dispatcher 22.

Although FIG. 5 shows the response to the mobile device 12 being handled by the dispatcher 22, similar protocol translation or conversion between HTTP used by the handler 26 and a communication protocol used by the mobile device 12 may instead be performed by the HTTP handler 26 or another protocol translation/conversion module in the IP Proxy system 18.

In the event that content is returned to the IP Proxy system 18 in other than the requested content type, an error message is preferably returned to the mobile device 12 and possibly the information source, web server 76, indicating that the request could not be completed as specified. Alternatively, if the returned content cannot be converted using the specified transcoder, then the HTTP handler 26 may search for a transcoder to transcode the received content into a content type that can be transcoded by the requested transcoder. The default transcoder or a different transcoder having an input content type and an output content type respectively corresponding to the received content type and the content type accepted by the mobile device 12 may instead be used. When content is returned in the mobile device-acceptable format, WMLC in the example of FIG. 5, the content may be forwarded to the dispatcher 22 without transcoding. Any time the specified transcoder could not be used to transcode returned content, however, the mobile device 12 is preferably informed that the request was not completed as specified, and possibly which transcoder was used instead of the specified transcoder.

Since the mobile device 12 specifies a particular transcoder to be used to transcode content returned from an information source in response to a request, control of any subsequent transcoding operations when the specified transcoder is not available may also be passed to the mobile device 12. For example, when the transcoder configuration file 72 does not include an entry for the specified WML->WMLC transcoder or the returned content is not of the transcoder's input content type, the IP Proxy system 18 may send a message to the mobile device 12 indicating that the specified transcoder is not available or cannot be used. The mobile device 12, a mobile device software application associated with the request, or a mobile device user may then respond to the message indicating the action to be taken. This action may include, for example, forwarding the content to the mobile device 12 without transcoding, invoking the default transcoder, invoking a different particular transcoder specified by the mobile device 12, software application or user, or discarding the content. The IP Proxy system 18 may also determine which if any of the transcoders with corresponding entries in the configuration file 72 may transcode the received content into either the output content type of the transcoder specified in the request or other content types, and identify such available transcoders in the message sent to the mobile device 12. The mobile device 12, software application or user may then use this information to determine if any of the available transcoders should be used to transcode the received content. For instance, if returned content cannot be transcoded by the specified transcoder into a format required for particular processing operations at the mobile device 12, but a second transcoder is available to transcode the returned content into a content type that can be viewed on the mobile device 12, then a user may specify that the returned content should be transcoded using the second transcoder and the transcoded content should be forwarded to the mobile device 12. Although the originally intended processing operations might not be possible using content that was transcoded using the second transcoder, the user is able to at least view the content.

In order to avoid sending connection requests that specify unavailable transcoders, it may be desirable for the mobile device 12 to query the IP Proxy system 18 for a list of available transcoders prior to issuing a connection request. A connection request can then be prepared using one of the transcoders known to be available to the IP Proxy system 18. If a required transcoder is not available at an IP Proxy system 18, then the mobile device 12 may query other IP Proxy systems in an attempt to find the required transcoder, prepare a connection request specifying an alternate but available transcoder or abort an information request operation involving the required transcoder.

It is contemplated that a specified transcoder may, for example, be associated with a particular mobile device software application or function and therefore is configured to output content in a form required by the software application. The content types output by such transcoders may be common types, such as WMLC in the above example, but may be adapted to certain displays, software application input formats or software application- or mobile device-related attributes. As such, a default or other transcoding operation may not produce content in a format usable by the mobile device software application, and an IP Proxy system 18 may therefore be configured to abort processing of a request or to discard content returned from an information source if the specified transcoder is not available. Such subsequent processing may be controlled by the mobile device 12, a mobile device software application or a mobile device user, as described above.

In the example shown in FIG. 5, the transcoder configuration file 72 includes entries for "mutually exclusive" transcoders, in the sense that the output content type of each transcoder is not compatible with an input type of any other transcoder. In one embodiment, one or more further transcoders may be used to convert received content into a format or type that may be accepted by the specified transcoder. The request sent by the IP Proxy system 18 to the information source, illustratively web server 76, may then be formatted to extend the accepted content types to include the input content types of any of the further transcoders as accepted content types.

Figure 6:
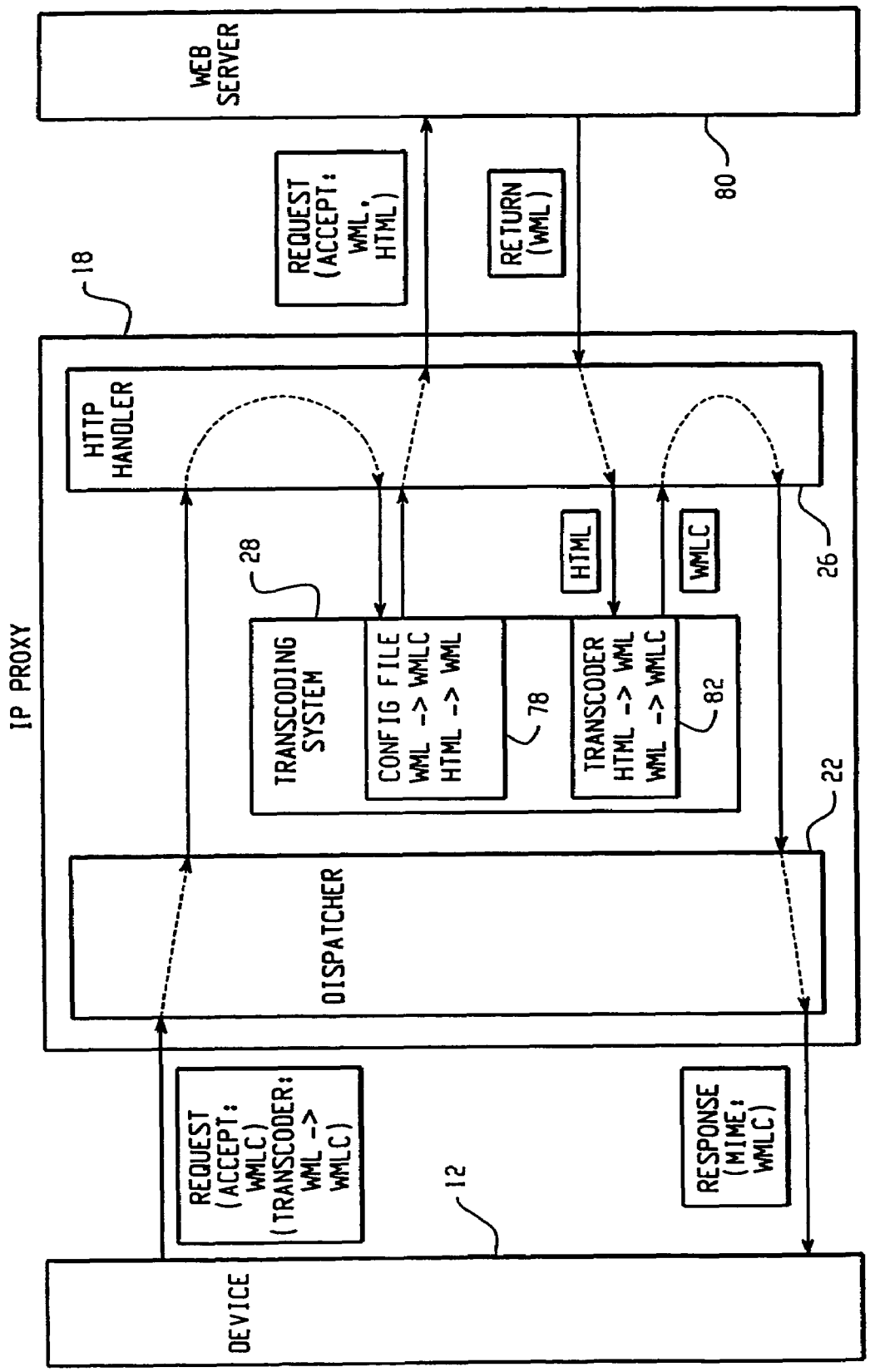
FIG. 6 is a signal flow diagram representing device-controlled transcoder selection with extension of accepted content types.

FIG. 6 is a signal flow diagram representing mobile device-controlled transcoder selection with extension of accepted content types. As in FIG. 5, FIG. 6 shows only those components of the IP Proxy system 18 directly involved in an HTTP request from a mobile device 12 in order to avoid congestion in the drawings.

An HTTP request specifying a particular transcoder and an accepted content type is sent from the mobile device 12 to the IP Proxy system 18, possibly through one or more intervening networks and interface components. As in the above example, the request is received by the dispatcher 22, which interprets the request as an HTTP request and loads the HTTP handler 26. The HTTP handler 26 then consults the configuration file 78, searching not only for the specified transcoder name, but also for entries associated with any transcoders that output content types that may be input to the specified transcoder. Therefore, according to this embodiment, additional MIME types are appended to the header Accept line of an HTTP request based not only on the specified transcoder input type, but also on input types for other transcoders. In FIG. 6 for example, the HTTP handler 26, perhaps in a first search pass through the configuration file 78, finds the specified WML->WMLC transcoder entry. The HTTP handler 26 may then repeat the configuration file search for any transcoders such as the HTML->WML transcoder that convert content into WML, which can be input to the specified WML->WMLC transcoder, to thereby identify further content types that may be accepted in response to the request. A chained transcoder 82 that converts HTML to WMLC may also be created from the HTML->WML and WML->WMLC transcoders. The HTML->WML and WML->WMLC transcoders may also be separately invoked. The configuration file search may be further repeated by the HTTP handler 26, depending for example on acceptable delays in HTTP request processing.

In order to avoid the delays and demand on processing resources associated with such multiple search passes through a configuration file 78, a transcoder content type lookup table is may be used. When transcoders are first installed in an IP Proxy system 18, a comprehensive mapping table is preferably constructed to map received content types to possible output content types. For example, in FIG. 6, a lookup table entry for the input content type of the specified transcoder, WML in FIG. 6, would indicate that HTML can be converted into WML. The table might instead be organized into single- and chained-transcoding sections, whereby if only a single transcoding operation is preferred, the single-transcoder part of the table including an entry for the specified WML->WMLC transcoder would be accessed. If further transcoding operations and the associated processing operations and time delays are acceptable, then the HTTP handler 26 may perform a lookup of the input content type of the specified transcoder in a chained-transcoder section of the table. Preferably, the format of the transcoding configuration file may be adapted to represent just such a lookup table in order to speed up the search. This may be accomplished, for example, by specifying a path between content types involving multiple transcoders.

The determination regarding whether or not multiple transcoding operations will be permitted may be made by the HTTP handler 26 either before or after the table or configuration file lookup operation is performed, before an HTTP request is sent to the web server 80, or even after the requested content is received from the web server 80. In the example of FIG. 6, it is assumed for illustrative purposes that multiple transcoders may be invoked. The Accept line in the header of the HTTP request from the mobile device 12 is therefore expanded by the system 18 to include HTML in addition to WML. As described above, the accepted formats are preferably listed in order of preference. Since HTML requires two transcoding operations instead of the single transcoding operation of the specified transcoder, WML is preferably listed before HTML in the Accept line of the HTTP request sent from the IP Proxy system 18 to the web server 80. It is also feasible for the chain of transcoders to include both local and remote transcoding services. These remote transcoding services could be transcoder files that the IP Proxy system 18 discovers, downloads and executes or they could be external transcoding services which receive data in one format and return it in another.

The web server 80 then returns the requested content, in HTML format in the example in FIG. 6, to the IP Proxy system 18 in response to the HTTP request. The HTTP handler 26 determines that the returned content is HTML, loads and executes the HTML->WML transcoder and then loads and executes the specified WML->WMLC transcoder on the WML result of the first transcoding operation. The resultant WMLC content is then forwarded to the dispatcher 22 and then to the mobile device 12. When WML content is returned by the web server 80, only the WML->WMLC transcoder would be invoked. In the event that the specified transcoder is not available or the returned content is not one of the accepted content types specified in the request from the IP Proxy system 18, request processing may either be aborted or proceed as described above.

A determination to allow or deny multiple transcoding operations may be based upon predetermined criteria such as maximum HTTP request processing time or maximum content transcoding time or processor time for example. This determination might also take a mobile device user-specified priority into account. If high time priority (low time delay) is assigned by the user to a submitted request, then single transcoder operations may be selected. Alternatively, if a high data priority is associated with a request, then any number of chained transcoder operations may be allowed in order to get the requested data back to the mobile device in an acceptable format. Multiple transcoders may also be specified in the information request from the mobile device. Other criteria which may be applied by a connection handler include but are in no way limited to allowing chained transcoders only for relatively small amounts of received content, only at certain times of day, under specific current traffic conditions, or only when the configuration file or lookup table is stored in a local file system. Further or alternate criteria may be apparent to those skilled in the art and as such remain within the scope of the present invention.

It is also possible that more than one multiple-transcoder chain may be available to convert between any two content types. In such situations, the IP Proxy System uses a priority scheme, based for example on transcoding cost or fidelity, to select between several available chains.

Specifying a Content Transcoder from an Information Source

Figure 7:
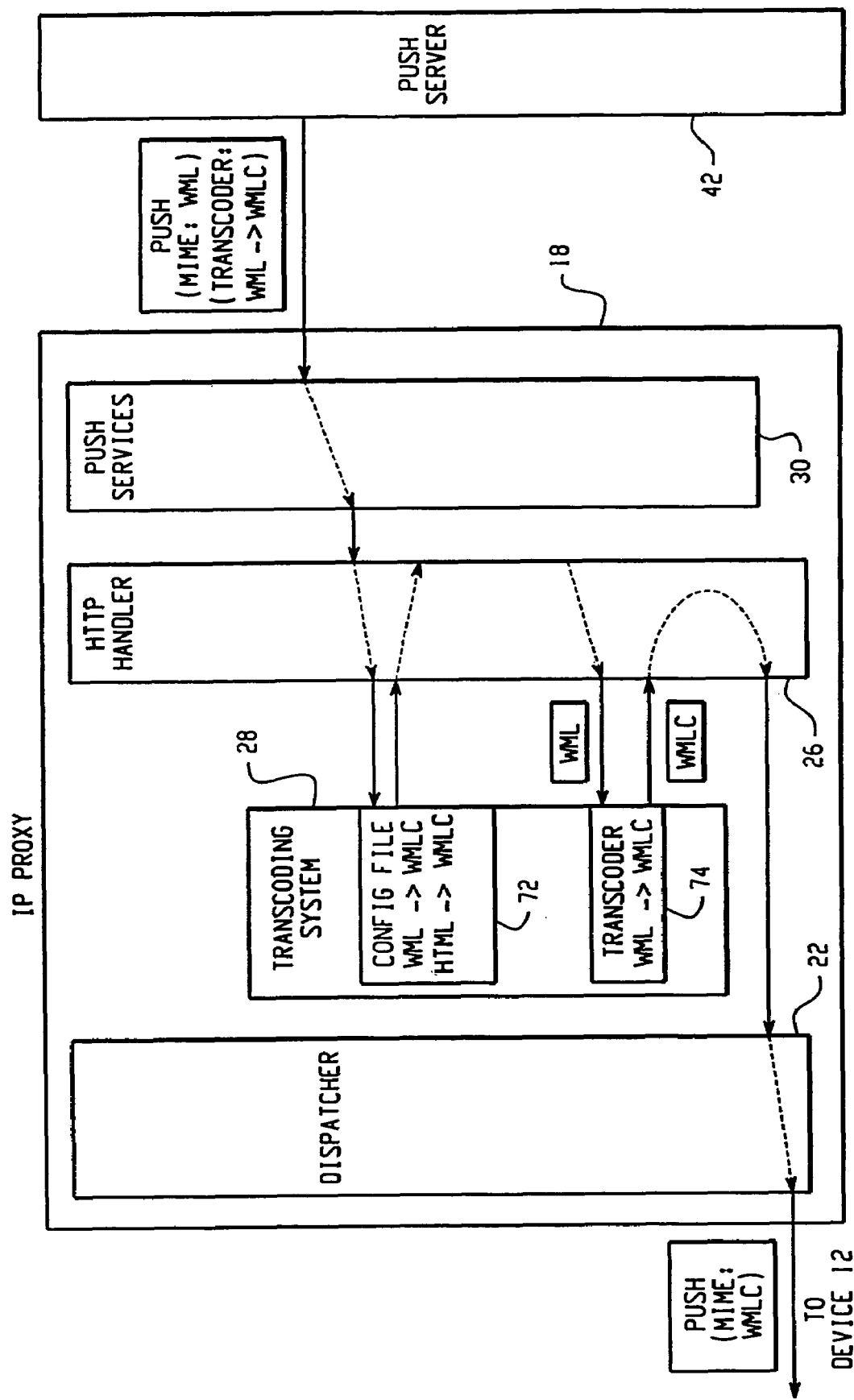
FIG. 7 is a signal flow diagram of an example of server-controlled transcoder selection for an HTTP operation .

A server or information push operation differs from information request/response operations in that an information source sends content to a mobile device 12 without first receiving a request to do so. Similar to the HTTP operations described above however, a particular transcoder may be specified by an information source attempting to push content to a mobile device 12. FIG. 7 is a signal flow diagram of an example of server-controlled transcoder selection for an HTTP operation. As is above, FIG. 7 shows only those components of the IP Proxy system directly involved in an HTTP-based server push.

In FIG. 7, content is pushed from the push server 42 to the IP Proxy system 18. For an HTTP-based operation, the push may be an HTTP post operation, in which the push server 42 submits a post request to the IP Proxy system 18. The post request, similar to the HTTP request described above, encloses header fields in which at least a transcoder name (WML->WMLC in this example) and possibly an indication of the type of content, such as a MIME type of WML in FIG. 7, may be specified. Since the content is provided by the same entity that selects the particular transcoder, the content type will normally be compatible with the specified transcoder and therefore need not necessarily be specified in the post request.

The post request from the push server 42 is received by the push services module 30. In the example of FIG. 7, the push operation is HTTP-based, and the push services module 30 therefore invokes the HTTP handler 26. It should be appreciated that different push services may be associated with respective handlers in an IP Proxy system 18, and that a single IP Proxy system 18 may provide several different push services. It is also contemplated that multiple push services modules may be associated with a single connection handler. Alternatively, a single push services module may be functionally similar to the dispatcher 22 and provide an interface between a push server 42 and any handler in an IP Proxy system 18. For the purposes of clarity however, only a single push services module 30 associated with the HTTP handler 26 is shown in FIG. 7.

The HTTP handler 26 preferably uses the transcoder name in the post request, WML->WMLC in FIG. 7, to perform a lookup in the configuration file 72 to determine if the specified transcoder is available in the IP Proxy system 18. As in the preceding embodiments, a particular transcoder is preferably specified in any post requests and transcoder configuration files using the same name. In FIG. 7, an entry for the transcoder specified in the post request exists in the configuration file 72. The WML->WMLC transcoder 74 is therefore available to the IP Proxy system 18, and the transcoder 74 is loaded and executed to transcode the WML content enclosed in the post request into WMLC content. The WMLC content is forwarded to the mobile device 12, through the dispatcher 22. When content is provided by a push server in a mobile device-acceptable format, WMLC in the example of FIG. 7, the post request may specify a null or other predetermined value in an appropriate request header field to specify that the content should be forwarded to the dispatcher 22 without transcoding. It is also contemplated that a push services module 30 may be configured to directly manage the transcoding of pushed content, instead of invoking a separate connection handler.

If the particular transcoder specified in the post request from the push server 42 is not available to the IP Proxy system 18, then the push operation may be aborted. Alternatively, a different transcoder having an input content type and output content type respectively compatible with the content from the post request and a content type accepted by the mobile device 12, if known to the IP Proxy system 18, may be used. Any time the requested transcoder could not be used to transcode pushed content, a push operation failure or error message may be returned to the push server 42, particularly if the push server 42 is configured to retry undelivered content. When the default or any other transcoder is used instead of the specified transcoder, then the push server 42 may be informed of the particular transcoder that was used. Any such alternate transcoding operations may instead be controlled by the push server 42, which may, for example, specify another transcoder name in response to a push operation failure or error indication message returned by the IP Proxy system 18. Since pushed content was not requested by the mobile device 12, no such error or failure message would typically be sent to the mobile device 12.

If the transcoder specified by a push server 42 is associated with a particular mobile device software application or function or configured to output content in an application-specific format for example, then alternate transcoders might not produce content in a format usable by the mobile device application. As described above however, a second transcoder may be available to transcode the content from the push server 42 into a content type that can at least be processed in a certain way, to be displayed on the mobile device 12, for example. In response to an error or failure message from the IP Proxy system 18, the push server 42 may re-submit the content and/or specify the second transcoder. The pushed content, although not suitable to be processed on the mobile device as originally intended, may thereby be viewed on the mobile device 12. The push server 42 may also set a transcoder substitution policy, such as no transcoder substitutions allowed, chained transcoders allowed, etc.

The signal flow diagram of FIG. 7 shows a single content transcoder in a server data push via an HTTP post operation. It should be apparent that a server may specify more than one content transcoder, to be used for example in a chained transcoding operation.

External Transcoder Systems

Figure 8:
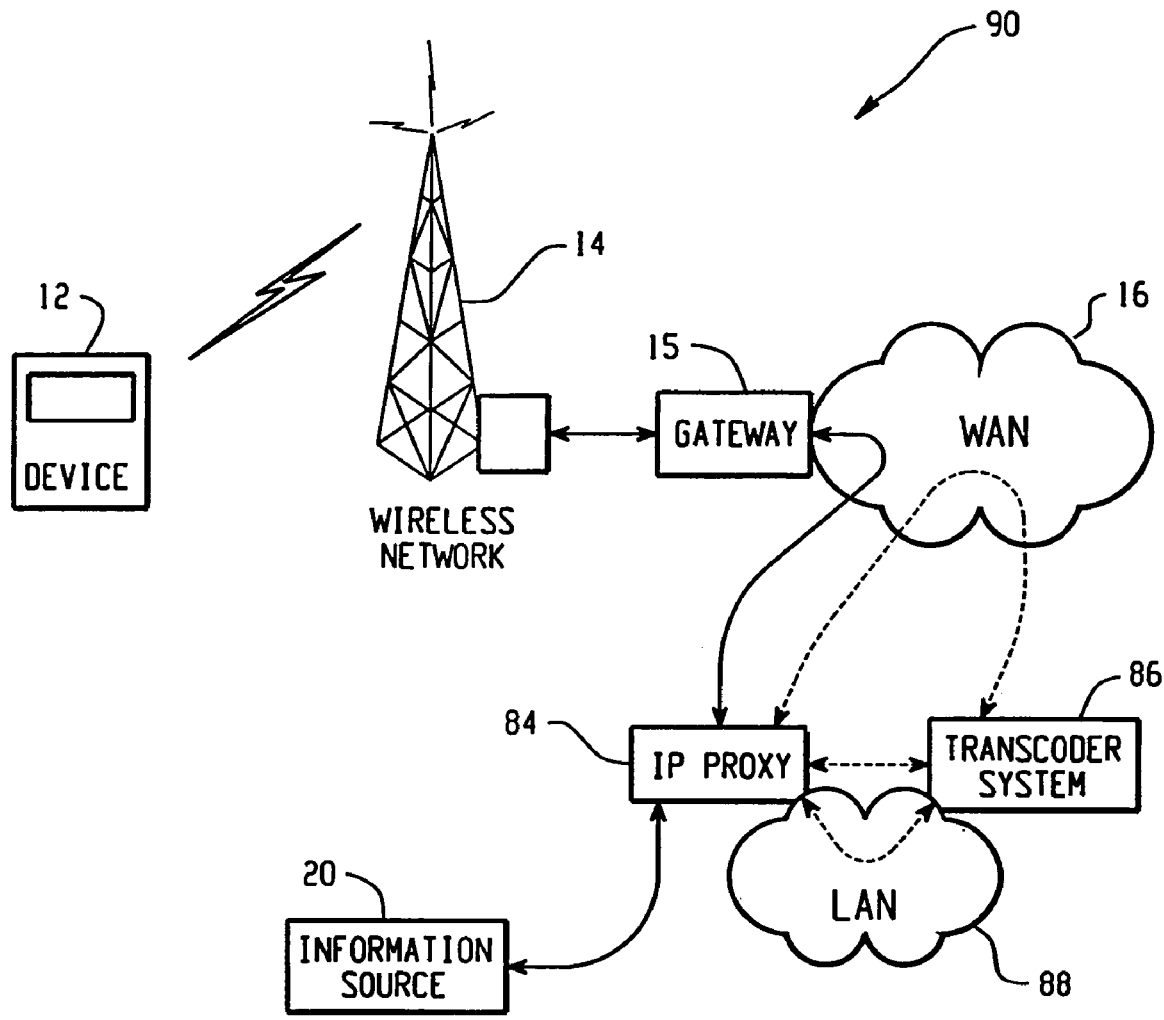
FIG. 8 is a general block diagram of a communication system with an external transcoder system.

As described briefly above, transcoders may be loaded as needed from a local store on a computer system on which an IP Proxy system 18 has been implemented. In another embodiment, transcoders may also be loaded from an external store. FIG. 8 is a general block diagram of a communication system with an external transcoder system.

The system 90 shown in FIG. 8 is similar to system 10 of FIG. 1, except for the external transcoder system 86. Elements common to both systems 10 and 90 have been described above and are therefore described only briefly. As shown by the dashed lines in FIG. 8, the IP Proxy system 84 may communicate with the transcoder system 86 through some sort of direct connection such as a serial port or connection, through a WAN 16 such as the Internet, or through a LAN 88 within which the IP Proxy system 84 and the transcoder system 86 are configured to operate. Other communication links between the IP Proxy 84 and the transcoder system 86 will be apparent to those skilled in the art.

Figure 9:
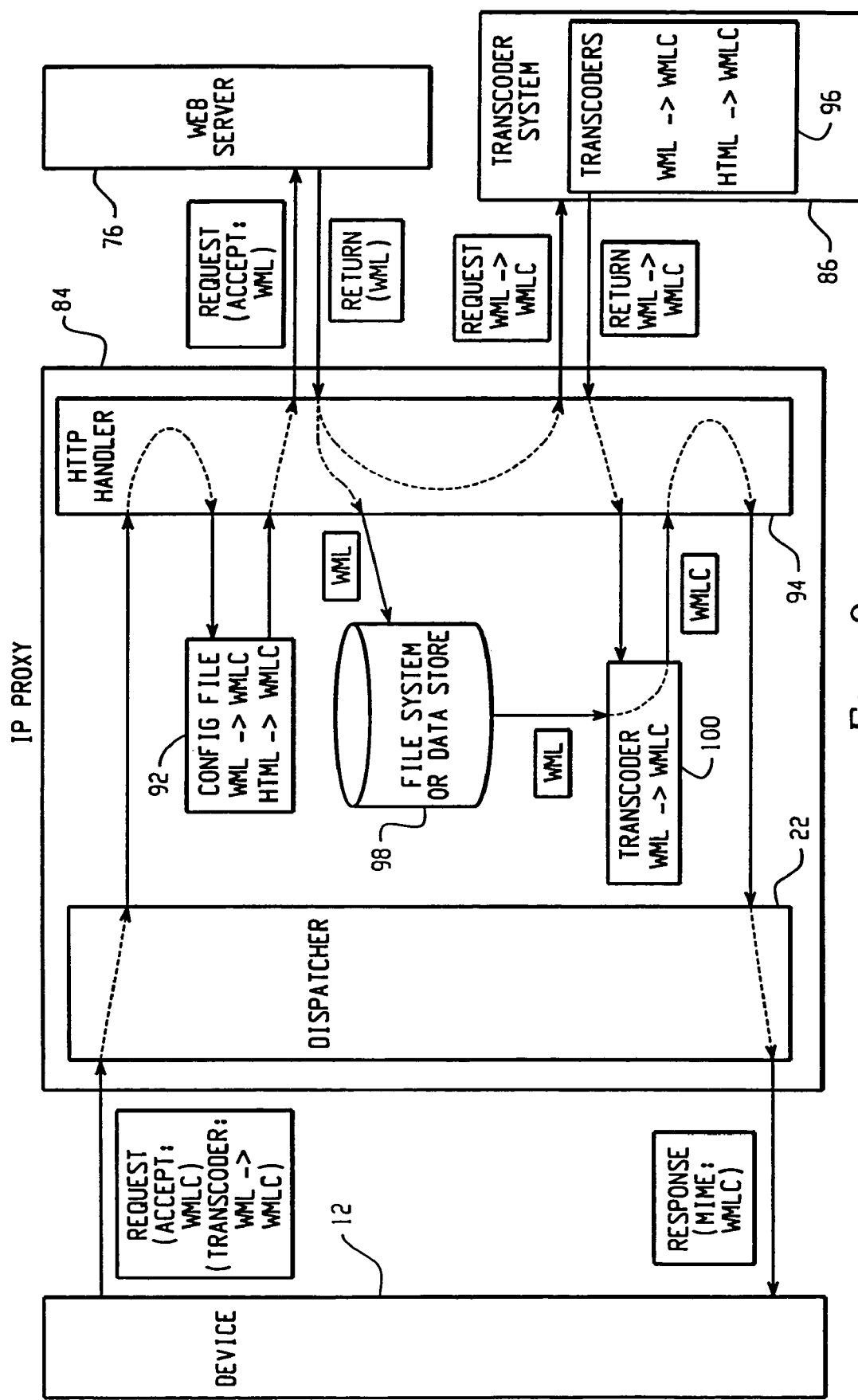
FIG. 9 is a signal flow diagram illustrating an example of device-controlled transcoder selection for an HTTP connection with an external transcoder system such as shown in FIG. 8.

FIG. 9 is a signal flow diagram illustrating an example of mobile device-controlled transcoder selection for an HTTP connection with an external transcoder system such as shown in FIG. 8. As in the preceding examples, an HTTP request is sent from the mobile device 12 to the IP Proxy system 84, specifying a particular transcoder (WML->WMLC) and possibly indicating the content type, WMLC in this example, that can be accepted at the mobile device 12. The request is received by the dispatcher 22 in the IP Proxy system 84, which determines that the request is an HTTP request and thus forwards the request to the HTTP connection handler 94. The HTTP handler 94 may be substantially similar to the HTTP handler 26 in FIG. 2 for example, although it operates somewhat differently than handler 24 to load content transcoders. The HTTP handler 94 receives the HTTP request from the mobile device 12 and may then refer to a transcoder configuration file 92 or a lookup table as described above to determine whether or not the specified WML->WMLC transcoder is available to convert content received in response to the request. If an entry corresponding to the specified transcoder is found in the configuration file 92 or lookup table, then the HTTP handler 94 sends a request to the appropriate information source such as web server 76. Web server 76 processes the request from the IP Proxy system 84 and returns WML content to the HTTP handler 94. These operations are substantially as described above in the preceding examples.

When the WML content is received by the HTTP handler 94, it is preferably stored in a file system or other data store 98 while the appropriate transcoder is loaded. In the example of FIG. 8, the HTTP handler 94 requests the specified WML->WMLC transcoder from the transcoder system 86. Although this request is shown in FIG. 8 as an HTTP request from the HTTP handler 94, it should be apparent that other transfer mechanisms might instead be used by an IP Proxy system 84 to retrieve a transcoder from a remote transcoder system. For example, if the IP Proxy system 84 communicates with the transcoder system 86 via a LAN 88 (FIG. 7), then a LAN protocol or data access and transfer scheme could be invoked by the HTTP handler 94 in order to retrieve any required transcoders. In FIG. 8, the transcoder system 86 locates the requested WML->WMLC transcoder among its available transcoders 96 and returns the requested transcoder to the IP Proxy system 84.

Regardless of the particular transcoder transfer mechanism implemented, the IP Proxy system 84, or in the example of FIG. 8 the HTTP handler 94, receives and executes the returned WML->WMLC transcoder, as indicated at 100. The previously received and possibly stored WML content may then be processed by the transcoder 100 to transcode the WML content, and a response containing the transcoded content is returned to the mobile device 12 by the dispatcher 22.

If chained transcoder operations are specified in the connection request from the mobile device 12, then more than one transcoder request may be made by the IP Proxy system 84 to the transcoder system 86. Multiple transcoders may instead be requested in a single request to the transcoder system 86. Processing of previously received content for chained transcoder operations may proceed either as each required transcoder is loaded by the IP Proxy system 84, with intermediate transcoded content possibly being stored in a file system or data store such as 98, or only when all required transcoders have been loaded. An IP Proxy system 84 may also extend the Accept line in an HTTP request sent to an information source if any of the transcoders available from an external transcoder system can transcode other content types into the input content type of the specified transcoder, as described above in conjunction with FIG. 6.

When a transcoding operation is complete, a transcoder loaded from the external system 86 is preferably stored locally by the IP Proxy system 84 in order to avoid subsequent requests to the external transcoder system 86 for the same transcoder. Retrieval and loading of a transcoder from a local or internal store in the IP Proxy system 84 will typically be completed much faster than a request to a remote system and reduces traffic on the communication link between the IP Proxy system 84 and the transcoder system 86. In such IP Proxy systems, the active connection handler, which is the HTTP handler 94 in FIG. 8, preferably determines if a required transcoder is stored in a local data store before requesting the transcoder from the external transcoder system 86. Depending upon the amount of available storage, transcoders may be stored indefinitely or for a certain predetermined period of time. Other memory management schemes, such as over-writing stored transcoders on an LRU basis for example, may also be used when memory resources are limited.

The configuration file 92 or transcoder lookup table may be adapted for external transcoder loading by including an indication of the location of a transcoder in the configuration file or table entry for the transcoder. The file 92 or table is preferably updated if a transcoder is stored to, or overwritten in, a local memory, such that the active handler can determine from the initial lookup operation whether or not the transcoder must be loaded from the external transcoder system 86. When a transcoder has not been or is no longer stored locally, then the file 92 or lookup table preferably indicates from where the transcoder may be retrieved. For a transcoder that may be retrieved through an HTTP connection, the corresponding file or table entry may indicate the IP address of the transcoder system 86, whereas a network address may be specified in the configuration file or lookup table when a LAN connection is used. If the location of a transcoder system from which a specified transcoder is available is known to a mobile device 12 or a mobile device user, then the location may also or instead be included in the connection request from the mobile device.

It is also contemplated that more than one external transcoder system may be implemented in a communication system such as 90. In such an arrangement, the configuration file 92 or lookup table would preferably include entries for all transcoders that are available to an IP Proxy system 84 through all of the external transcoder systems with which it can communicate. An IP Proxy system 84 may thereby download transcoders from any of a number of transcoder systems via direct or network connections. Overall operation of an IP Proxy system 84 with multiple transcoder systems would be substantially as described above, except that different transcoder systems may be accessed, possibly using different transfer mechanisms and communication protocols, for each data transcoding operation. Chained transcoding operations may also potentially involve communication with different transcoder systems.

The configuration file 92 or lookup table are preferably arranged to facilitate a simple resolution scheme when a particular type of transcoder is available from more than one transcoder system. Although an IP Proxy system 84 may be able to access multiple transcoder systems, an owner or administrator of an IP Proxy system 84 may designate one of these transcoder systems as a preferred or default system from which the IP Proxy 84 system first attempts to download a transcoder. The order of preference of transcoder systems for any transcoder available from more than one transcoder system may for example be reflected in the order of configuration file or lookup table entries. If the file or table is arranged by transcoder type, then entries corresponding to the most preferred sources for a particular transcoder are preferably listed before entries associated with other transcoder systems. The configuration file or lookup table may instead be arranged according to transcoder system, with all entries for the default or preferred transcoder system occurring first. A preferred transcoder system might also be specified in a connection request from the mobile device 12. In these example arrangements, an IP Proxy system 84 will preferably attempt to load a particular transcoder from a preferred source before accessing any other sources.

It should be apparent from the foregoing description that if the specified transcoder could not be loaded by an IP Proxy system 84, then an error message may be returned to the mobile device 12 and possibly the web server 76. Any of the error or failure operations described above may be performed by the IP Proxy system 84 and mobile device 12 if the specified transcoder could not be used to transcode received content.

A data push operation from a push server such as 42 may proceed in a similar manner and therefore will be described only briefly. A push services module may either invoke an appropriate connection handler to process a push request from a push server or possibly be configured to process the request directly. Any transcoder(s) specified in the push request would then be downloaded by the active connection handler or possibly another connection handler, if required, from the external transcoder system 86 or a further transcoder system specified in the push request. Once downloaded to the IP Proxy system 84, the specified transcoder is invoked to process the content enclosed in the push request. The transcoded content may then be pushed to an intended destination mobile device 12 through the dispatcher 22 if any protocol translation is necessary. This type of push operation is thus substantially the same as described above with reference to FIG. 7 except that the specified transcoder (or transcoders if chained transcoder operations are specified in or allowed for the push request) is downloaded from an external transcoder system. Downloaded transcoders may be stored by an IP Proxy system 84 in a local store in order to avoid subsequent downloading of the same transcoders. Any of the above failure or error processing schemes may also apply to data push operations.

Figure 10:
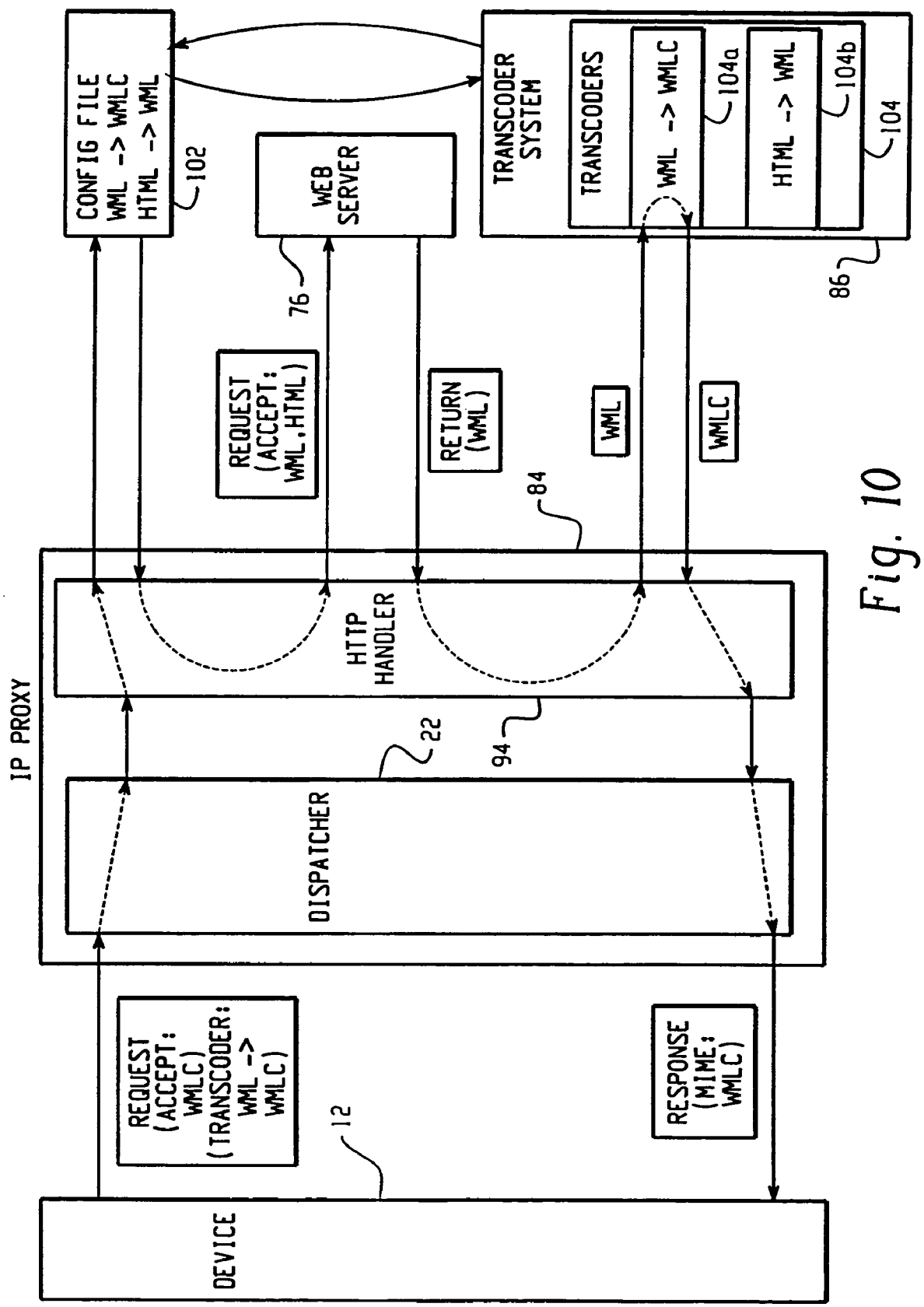
FIG. 10 shows a further signal flow diagram for an external transcoder system.

FIG. 10 shows a further signal flow diagram for an external transcoder system. In FIG. 10, not only the transcoder system 86, but also the configuration file 102 is external to the IP Proxy system 84 and therefore may be shared among multiple IP Proxy systems. Communications between an IP Proxy system 84 and the configuration file 102 may be via a direct connection or a network connection, and may be different for different IP Proxy systems. For example, the configuration file 102 may be maintained by an owner or operator of a particular IP Proxy system 84 which is linked to the configuration file by a direct communication link, whereas other IP Proxy systems may communicate with the configuration file 102 through local or wide area network connections. The configuration file 102 might also be maintained at the transcoder system 86. As above, the configuration file 102 may be implemented as a lookup table. The configuration file 102 may thus be considered a registry, with which one or more external transcoder systems such as 86 register available transcoders.

When an HTTP request specifying a particular transcoder is received by the dispatcher 22 in the IP Proxy system 84, it is forwarded to the HTTP handler 94, which as described above determines if the specified transcoder is available in the IP Proxy system 84. In the example of FIG. 10 however, the configuration file 102 is remote from the IP Proxy system 84. If the configuration file 102 is accessible via HTTP, then the HTTP handler 94 manages the transcoder lookup function with the configuration file 102. If the configuration file 102 is not adapted for HTTP, then a different connection handler may be invoked to facilitate the transcoder lookup or configuration file search.

Depending upon the transcoders available to the IP Proxy system 84, the HTTP handler 94 may include both the input content type of the specified transcoder, WML in this example, and any additional content types which may be transcoded into the input content type of the specified transcoder as accepted content types in the request to the information source, illustratively web server 76. The request from the IP Proxy system 84 to the web server 76 therefore includes not only WML but also HTML as accepted content types, since HTML can be transcoded into WML by the HTML->WML transcoder 104*b*, which has a corresponding entry in configuration file 102. Either of these content types can ultimately be processed by the specified WML->WMLC transcoder.

As above, it is assumed that the web server 76 from which content is requested returns WML content to the HTTP handler 94. The transcoding system 86 in the example shown in FIG. 10 includes a set of remotely executable transcoders 104, comprising a WML->WMLC transcoder 104a and an HTML->WML transcoder 104b, and thereby enables remote transcoding of content. Instead of requesting and loading the WML->WMLC content transcoder 104a from the transcoder system 86, the HTTP handler 94 (or another connection handler, depending on the particular transcoder system and the transfer schemes it supports) transfers the WML content to the transcoding system 86. Within the transcoding system 86, the appropriate WML->WMLC transcoder 104a is executed and the WML content is transcoded into WMLC format. The WMLC content is then returned to the HTTP handler 94, or to another connection handler if IP Proxy system 84 to transcoder system 86 communications do not use HTTP. When the WMLC content is returned by the transcoding system 86 and received by the HTTP handler 94, possibly through another connection handler which communicates with the transcoding system 86, it is forwarded to the dispatcher 22. The dispatcher 22 then prepares a response including the WMLC content and sends the response to the mobile device 12. The HTTP handler 94 may instead prepare the response, which would then be translated (if necessary) by the dispatcher 22 to conform to a communication protocol or scheme used by the mobile device. Illustratively, the WML content returned by the web server 76 may be stored by the HTTP handler 94 in case a data transfer or transcoding error occurs. Local storage of the WML content allows an IP Proxy system 84 to re-submit the content, to either the same transcoder system 86 or a different transcoder system, without having to request the content from the web server 76.

If the requested content is returned by the web server 76 as HTML content, then the HTTP handler 94, through another handler if required, would submit the HTML content to the transcoder system 86 for chained transcoding using both the HTML->WML transcoder 104b and then the WML->WMLC transcoder 104a specified in the mobile device request. Such chained transcoding operations may also be specified by the mobile device 12 in the connection request. Chained transcoders may either be part of the same transcoding system 86 as shown in FIG. 10, or implemented in different transcoder systems. When a chained transcoding operation involves different transcoder systems, content returned by an information source may first be transmitted to one transcoder system for transcoding into an intermediate content type which is returned to the IP Proxy system 84, and the intermediate content type may then be sent to another transcoder system, for transcoding using the specified transcoder or another intermediate transcoder in a transcoder chain. Content is preferably forwarded between different transcoding systems via the IP Proxy system 84 which is processing the connection request, but may instead be directly transmitted from one transcoder system to another if compatible data transfer mechanisms have been implemented in each transcoding system.

Data request errors or failures, such as transcoder errors or other situations in which a specified transcoder is unavailable, may be managed according to any of the schemes described above, possibly including such further operations as using a different transcoder to transcode content, returning an error message to the mobile device 12, returning an error message the web server 76, and controlling any subsequent processing of a request or content from the mobile device 12 and/or the web server 76.

Push operations for systems with one or more external configuration files such as 102 will be apparent from the foregoing illustrative examples. A data push may be accomplished by a push server 42 substantially as described above, except that a particular transcoder would be specified in a push request instead of a request from the mobile device 12 as shown in FIG. 10. In addition, a push server 42 may consult an external configuration file to determine which transcoders are available to an IP Proxy system 84 before a push request is submitted. If a required type of transcoder is not available, then the push server 42 may determine if any other transcoder operation, including chained transcoder operations, may be suitable for the push request and an intended recipient mobile device 12 and format the push request accordingly, thereby possibly avoiding failures or errors at the IP Proxy system 84. As described above, the configuration file 102 may be a registry including entries for transcoders available from one or more transcoder systems. When entries in the configuration file 102 include an address, such as an IP address, or other identifier of a transcoder system from which a particular transcoder is available, then the address may be supplied to an IP Proxy system 84 by a push server 42 in a push request. At least some transcoder searching operations may thereby be off-loaded from IP Proxy systems 84 to push servers 42.

In the system of FIG. 10, it is contemplated that the transcoder system 86 and configuration file 102 may communicate with each other to ensure that the configuration file 102 accurately indicates which transcoders are available. A configuration file may be associated with a particular type of connection such as HTTP connections and thus HTTP connection handlers. If a configuration file 102 is associated with a particular transcoder system 86, then the configuration file may be resident within the transcoding system 86.

If multiple transcoding systems are implemented, a shared configuration file storing transcoder entries for the transcoders available in all transcoder systems 84 may simplify the transcoder lookup performed by a connection handler. An IP Proxy system 84 or push server 42 need then only consult a single configuration file to determine if appropriate transcoders are available from any transcoder systems with which it can communicate. This single configuration file/server could also support protocols to allow external transcoding servers to register. A registration process could add a list of available transcoders to the single configuration file, for example.

An external transcoding system 86 preferably supports a query function to allow a mobile device 12 or a push server 42 to determine which transcoders are available before a connection request is prepared and sent to an IP Proxy system 84. Some mechanism whereby transcoders can be added to the transcoder system 86 and configuration file 102 would also preferably be supported. A push server 42 may then add a new transcoder to the transcoding system 86 and push content that relies on the new transcoder to mobile devices such as mobile device 12 through an IP Proxy system 84.

External transcoder systems 86 include download systems from which transcoders may be downloaded by an IP Proxy system 84 and executed locally (see FIG. 9) and remote transcoding systems to which content is sent for transcoding at the transcoding system (see FIG. 10). In another embodiment, a "hybrid" transcoder system incorporating aspects of both these types of transcoder systems. When a hybrid transcoder system is available to an IP Proxy system 84, the IP Proxy system 84 may either download a required transcoder from the transcoder system or send content to the transcoder system to be transcoded remotely. The selection of transcoder download or remote transcoding may be dependent, for example, upon the amount of data to be transcoded, the complexity of the transcoding (single or chained operations), or other criteria. Similarly, chained transcoding operations may involve download transcoding systems and local transcoder execution as well as remote transcoding systems.

EXAMPLE IMPLEMENTATION

Figure 11:
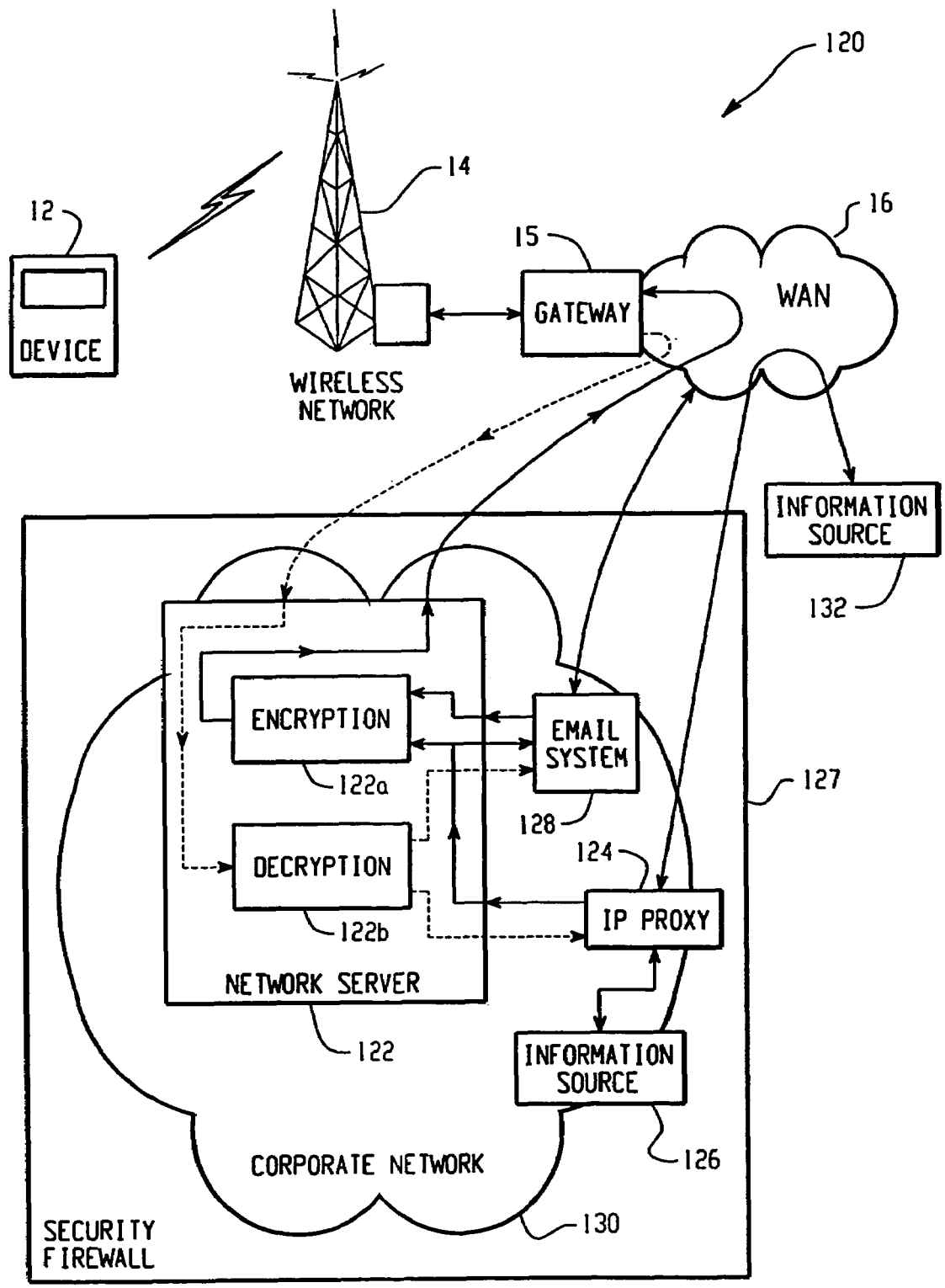
FIG. 11 is a block diagram showing an IP Proxy system implemented in a secure network.

An example implementation of an IP Proxy system will now be described. FIG. 11 is a block diagram showing an IP Proxy system implemented in a secure network.

The system 120 in FIG. 11 includes a mobile device 12 that operates within a wireless network 14. Through a gateway 15, the mobile device can receive and preferably also send data over a WAN 16 such as the Internet. These elements of the system 120 are substantially the same as similarly labelled elements in FIG. 1. In the system 120 however, the IP Proxy system 124 is configured within a private network such as a corporate network 130, behind a security firewall 127, and communicates with the gateway 15 through a network server computer 122. In a particular example embodiment, the network server 122 is associated with an email system 128. Two information sources, an internal source 126 and an external source 132, are also shown in FIG. 11.

The network server 122 preferably enables secure communication to the mobile device 12, as indicated by the encryption and decryption blocks 122a and 122b. The network server 122 encrypts any communications directed to a mobile device 12. The intended recipient mobile device 12, using a secret key stored therein, can decrypt encrypted communications from the network server 122. A mobile device 12 similarly encrypts any information sent to the network server 122, which can be decrypted by the decryption module 122b. Those skilled in the art of cryptography will appreciate that the keys and encryption algorithms used at the network server 122 and mobile device 12 are preferably chosen so that it would be computationally infeasible to decrypt encrypted information without the required secret key. One preferred encryption scheme is triple-DES (Data Encryption Standard).

Key distribution between a network server 122 and a mobile device 12 may be accomplished via a secure connection such as a secure physical connection between the mobile device 12 and the network server 122, or between the mobile device 12 and another computer within the corporate network. Known public key cryptography techniques may instead be used for key distribution. In a public key scheme, a public key is used to encrypt information in such a way that the encrypted information may be decrypted using a corresponding private key. The public key is stored by, and may be retrieved from, a publicly accessible key repository commonly referred to as a certificate authority or CA, whereas the private key is stored only at a mobile device or system with which the public key is associated. Thus, a network server 122 or any other sender that wishes to send encrypted information to a mobile device 12 may retrieve the mobile device's public key from a CA and use the public key to encrypt information destined for the mobile device 12. A mobile device 12 may similarly obtain a network server's public key from a CA and use the public key to encrypt communication signals to be sent to the server.

Figure 12:
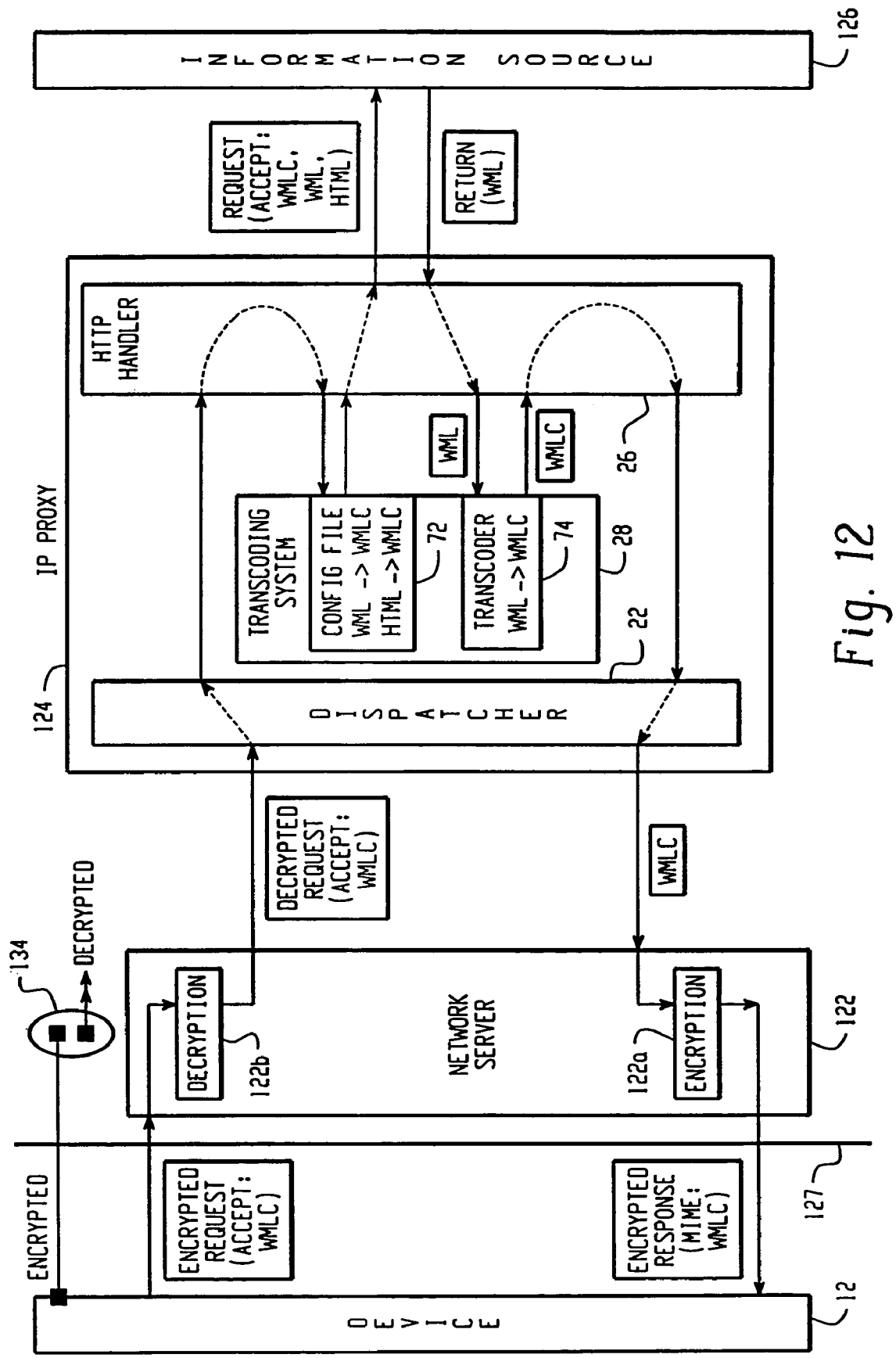
FIG. 12 is a signal flow diagram illustrating a corporate data access operation.

Regardless of the particular key distribution scheme and encryption techniques used, encrypted communications between a mobile device 12 and network server 122 allows for secure access to corporate or other private information using a mobile device 12. Consider the example of the internal information source 126 within the security firewall 127, described below with reference to FIG. 12. FIG. 12 is a signal flow diagram illustrating a corporate data access operation. In keeping with the above illustrative example operations, FIG. 12 shows an HTTP-based data access operation.

In FIG. 12, an HTTP request is encrypted at the mobile device 12, preferably using a strong encryption routine such as triple-DES (3DES), before it is sent to the network server 122 through the wireless network 14 (FIG. 11) and possibly other intermediate networks or components like the gateway 15 and WAN 16 shown in FIG. 11. The encrypted request is then received by the network server 122 and decrypted in the decryption module 122b. The decrypted request is forwarded to the IP Proxy system 124, which may proceed to process the request substantially as described above. The active handler, the HTTP handler 26 in this example, may consult the configuration file 72 or transcoder lookup table and expand the accepted content types to include content types that can be transcoded into the format(s) that can be accepted by the mobile device 12. A request, possibly including further content types, is then sent by the HTTP handler 26 to the information source 126, which then returns requested information, in WML format in this example. An appropriate transcoder 74 is loaded and invoked by the HTTP handler 26 if necessary and the requested content, preferably in a format requested by the mobile device 12, is returned to the network server 122 through the dispatcher 22. The network server 122 then encrypts the content received from the IP Proxy system 124 in its encryption module 122a and sends the encrypted content in a response to the mobile device 12. In some implementations, the protocol conversion or translation operations associated with the dispatcher 22 may instead be performed by the network server 122.

The information source 126 may be a computer system or data store preferably configured for operation on the private network 130, such as a file server or other data store accessible through the network 130. In the example of a corporate network, the information source 126 may include confidential or otherwise sensitive information that an owner of the network 130 strives to keep private. The security firewall 127 is intended to prevent unauthorized access to private network components including the information source 126. In some situations, the very existence of information stored at the information source must remain confidential. The encryption of the request from the mobile device as shown in FIG. 12 prevents an unauthorized party from determining the contents of the request without breaking the encryption, which as described above is not computationally feasible for strong encryption schemes such as 3DES. The request remains encrypted until received by the network server 122 and decrypted, behind the security firewall 127, as indicated at 134 in FIG. 12. The request is therefore virtually as secure as a request sent from a computer system on the network 130.

Once decrypted, the request is processed by the IP Proxy system 124 and information source 126 as described above. However, encryption of the requested content by the encryption module 122a in the network server 122 before it is sent to the mobile device 12 similarly ensures that the content can only be viewed by the mobile device 12. Confidential corporate information therefore remains encrypted and thus secure until received and decrypted at the mobile device 12, thereby effectively extending the security firewall to the mobile device 12. Both the request and the information returned to the mobile device in response thereto are secure.

In known remote data access schemes such as WAP, gateway systems which provide for data access using mobile devices are normally located outside corporate or private premises, at the location of a service provider for example. Any confidential or sensitive information encrypted at the private premises is decrypted at the gateway system, outside the corporate firewall, and then re-encrypted before being sent to the destination mobile device or devices. The information is therefore in the clear at the gateway system and thus accessible by an owner or operator of the gateway system. Furthermore, the owner or operator of a private network from which the information was sent typically has no control over security arrangements at the gateway system, such that the information is vulnerable to attacks on the gateway system.

The arrangement shown in FIGS. 11 and 12 provides for secure remote access to private, confidential or otherwise sensitive information. Information is encrypted from end-to-end between the network server 122 and any mobile device 12. Any level of security may be implemented at the security firewall 127 to protect confidential information stored at an information source such as 126, and when encrypted by the network server 122, information is not decrypted at any intermediate point before being received at a mobile device 12. The information is in the clear only "inside" the point 134, behind the security firewall 127, and on the mobile device. Security arrangements such as password or passphrase control are also preferably implemented at the mobile device 12 to prevent an unauthorized user from using the mobile device 12 or decrypting received encrypted information. For example, computer workstations may be protected by password-deactivated system locking and access to a corporate network 130 is normally protected by login passwords. Similarly, a password may be required to use a mobile device 12, while a different passphrase may be necessary to decrypt any encrypted information stored on the mobile device. A mobile device 12 and information stored thereon is thereby just as secure as a network workstation and information stored on a network. Such techniques as limited password or passphrase entry retries, mobile device 12 or mobile device memory reset after a predetermined number of failed password/passphrase entries, dynamic and possibly random password/passphrase updates and the like may be used to further improve mobile device security.

For an external information source 132 (FIG. 11), a data access operation is substantially the same as shown in FIG. 12, except that the information source is outside the firewall 127. The request and response exchange between the mobile device 12 and the network server 122 may be encrypted, but information exchanged with the information source 132 may be unsecure. If the information provided by the information source 132 is not private or confidential, then unsecure exchange between the IP Proxy system 124 and the source 132 will be sufficient for most purposes. However, if the external source 132 provides private information, then alternate arrangements are preferably provided.

One possible measure to improve the security of information being requested from an external source 132 is to secure the communications between the IP Proxy system 124 and the source 132. For example, the IP Proxy system 124 may be adapted to support Secure HTTP (HTTPS), Secure Sockets Layer (SSL) or other secure communication schemes in order to securely access information at the information source 132. Information from the source 132 may thereby be securely transferred to the IP Proxy system 124 and is then protected by the security firewall 127. Encrypted information may be decrypted by the IP Proxy system 124, by the active connection handler for example, and transferred to the network server 122, which then encrypts the information for transmission to the mobile device 12. As above, information is only in the clear behind the firewall 127. Alternatively, a secure communication session may be established between the mobile device 12 and source 132 through the IP Proxy system 124. In the system of FIG. 11, communications between the mobile device 12 and network server 122 would then be double-encrypted.

As shown in FIG. 11, the network server 122 is also associated with the email system 128. In one embodiment, the network server 122 provides redirection of data items from the email system 128 to mobile device 12. One such system is described in detail in U.S. Pat. No. 6,219,694, entitled "System And Method For Pushing Information From A Host System To A Mobile Data Communication Device Having A Shared Electronic Address", and issued to the assignee of the present application on Apr. 17, 2001. The complete disclosure of this patent is hereby incorporated into this application by reference.

Since the network server 122 is also associated with the IP Proxy system 124, integrated functionality between the email system 128 and the IP Proxy system 124 may be possible. In one embodiment, the IP Proxy system 124 uses encryption functionality of the network server 122 as well as a transport mechanism via which the network server 122 communicates with the mobile device 12. Other functions of the network server 122, such as data compression for example, may similarly be exploited by an IP Proxy system 124 to improve the efficiency of use of wireless communication resources. As described briefly above, content destined for a mobile device 12 may be addressed to the mobile device using an email address in the email system 128 associated with the mobile device user. In this example, content forwarded to the mobile device 12 by the IP Proxy system 124 may also be stored in the user's mailbox on email system 128 by the network server 122, as indicated in FIG. 11, to thereby provide both a record of IP Proxy system operations and a stored copy of any forwarded content. Other integrated functions may include but are in no way limited to email-based content requests from mobile devices and addressing of mobile device-destined information by the IP Proxy system 124 using an email address on the email system 128. Still further integrated functions may be enabled where a network server 122 or the IP Proxy system 124 is associated with any other services.

It will be appreciated that the above description relates to exemplary embodiments by way of example only. Many variations on the invention will be apparent to those of ordinary skill in the art, and such variations are within the scope of the invention as described, whether or not expressly described.

For example, embodiments of the invention have been described primarily in the context of an IP-based system. Similar proxy systems for other types of communication systems are also contemplated within the scope of the invention. Other types of connections, connection handlers and transcoders than those described above will also be apparent to those skilled in the art.

Depending upon the particular implementation of a remote data access system and the features to be supported, not all of the elements shown in FIG. 2 are required. Where push services are not supported for example, the proxy system will not include push services 30.

The instant invention is also in no way limited to content type indication using MIME types. MIME types are useful in conjunction with the instant invention, but are not required to practice the invention. Other content type indicators may be substituted for MIME type to indicate the type or format of requested or received content.

Although the transcoders described above convert between well-known information types or formats, custom transcoders could be developed and implemented for virtually any information format, including for example application program file types and proprietary formats. As described above, a proxy system in accordance with the instant invention is preferably configurable and new content transcoders may be added.

It is also possible that information content from an information source may include multiple different content types, not just a single content type as described above. For such multiple-type content, transcoders may be selected, for example, to transcode the content into a single content type, or into multiple content types accepted at a mobile device. In the case of transcoder selection by a mobile device or information source as described above, a list of transcoders for any or each part of multiple-type information type content may be specified in a connection request, a response to a request, or a push request. A respective transcoder may be specified and used for each part of the information content having a particular content type. Respective transcoders may be selected for each of the multiple content types based on different selection schemes. For example, when the multiple content types include a first content type and a second content type, a transcoder may be specified for the first content type, whereas a transcoder for the second content type may be selected based on a type or identifier of a mobile device or information source.

When any part of multiple-type information content cannot be transcoded as specified, where a specified transcoder is not available for example, only other parts of the information content might be transcoded and sent to a mobile device. Alternatively, a default transcoding operation as described above may be used to transcode parts of multiple-type content. Non-transcoded parts of multiple-type content, or possibly all of the multiple-type content, could instead be replaced with a link or other information that may be used to subsequently access the information content or parts thereof, and sent to a mobile device. Information indicating the multiple content types and/or required or recommended transcoders could also be sent to the mobile device. The information content or parts thereof may then be retrieved by the mobile device by submitting a connection request or possibly further transcoding instructions or an alternate transcoder selection to an IP Proxy system.

Furthermore, a proxy system may be implemented in any network, not only in a corporate network as shown in FIG. 11. Installation of a proxy system in an ISP, ASP, or Virtual Network Operator (VNO) system would provide for secure remote access to network information and secure transfer of information between any network users, including transfers between mobile devices of ISP, ASP or VNO users.

Although the invention has been described in detail with reference to certain illustrative embodiments, variations and modifications exist within the scope and spirit of the invention as described and defined in the following claims.

What is claimed is:

1. A system for providing data access between an information source and a mobile communication device, the system comprising:
  a transcoding system comprising a first storage medium containing a plurality of processor executable transcoders, each transcoder executable to transcode information content from a respective first content type into a respective second content type;
  a second storage medium containing a configuration file comprising a listing of transcoders available at the transcoding system, the first and second storage mediums physically located at locations remote from each other; the configuration file configured to receive updates from the transcoding system to allow the configuration file to accurately identify the transcoders that are available at the transcoding system; and
  a first network device physically located at a location remote from both the transcoding system and the configuration file, the first network device comprising a connection handler system, the connection handler system operable to receive connection data for a connection between the information source and the mobile communication device and to select a corresponding connection handler from a plurality of connection handlers based on the connection data, the selected connection handler operable to transmit information content received from the information source to the transcoding system and operable to specify to the transcoding system one or more transcoders from the plurality of transcoders to use to transcode the information content, the selected connection handler further operable to receive transcoded information content from the transcoding system and to send the transcoded information content to the mobile communication device.

2. The system of claim 1, wherein the connection handler system comprises a connection handler directory, the connection handler directory storing connection handler data.

3. The system of claim 2, wherein the connection handler data comprises connection handler data associated with at least one connection handler.

4. The system of claim 2, wherein the connection handler data comprises a network address specifying the location of a connection handler.

5. The system of claim 4, wherein the connection handler system is operable to access the location specified by the network address, retrieve the connection handler, and store connection handler data associated with the connection handler in the connection handler directory.

6. The system of claim 1, wherein the transcoding system includes a transcoder directory, the transcoder directory storing transcoder data.

7. The system of claim 6, wherein the transcoder data comprises transcoder data associated with at least one transcoder.

8. The system of claim 1, wherein the connection data includes accept data indicating an acceptable content type that the mobile communication device is operable to receive.

9. The system of claim 8, wherein the selected connection handler is operable to determine a received content type of the information content received from the information source and determine whether the received content type matches the acceptable content type.

10. The system of claim 9, wherein the selected connection handler is further operable to select one or more transcoders to transcode the information content where the received content type does not match the acceptable content type.

11. The system of claim 9, wherein the selected connection handler is further operable to send an error message to the mobile communication device if the information content cannot be transcoded into the acceptable content type.

12. The system of claim 6, wherein the transcoding system is operable generate and store mapping data comprising transcoding chains, each transcoding chain selecting one or more transcoders to transcode the information content from a respective input content type into a respective output content type.

13. The system of claim 12, wherein the mapping data is updated upon the addition or deletion of transcoding data.

14. The system of claim 12, wherein the selected connection handler is operable to determine a received content type of the information content received from the information source, to determine an acceptable content type that the mobile communication device is operable to receive, and to select one of the transcoding chains to transcode the information content from the received content type into the acceptable content type.

15. The system of claim 1, wherein the selected connection handler is operable to specify a list of content types in order of preference and to provide the list of content types to the information source.

16. The system of claim 15, wherein the selected connection handler is operable to determine a received content type of the information content received from the information source, to determine an acceptable content type that the mobile communication device is operable to receive, and to select the one or more transcoders to transcode the information content from the received content type into the acceptable content type.

17. The system of claim 15, wherein the information content includes multiple different content types and the selected connection handler is operable to select a respective transcoder to transcode the information content of each of the multiple different content types.

18. A method for providing remote data access to a mobile communication device, comprising the steps of:
   receiving a connection request at a first location and selecting one of a plurality of connection handlers based on the connection request;
   establishing a connection with an information source responsive to the connection request using the selected connection handler;
   receiving information content from the information source via the selected connection handler;
   accessing a configuration file on a storage medium at a second location to identify available transceivers;
   selecting via the selected connection handler one or more transcoders associated with an identifier of the mobile communication device, each transcoder being configured to transcode information content from a respective input content type into a respective output content type;
   retrieving the one or more transcoders from a storage medium at a third location over a network;
   transcoding the information content at the first location using the retrieved one or more transcoders to create transcoded information content; and
   forwarding via the selected connection handler the transcoded information content to the mobile communication device.

19. The method of claim 18, wherein the step of receiving a connection request comprises the step of receiving a connection request from the mobile communication device.

20. The method of claim 18, wherein the connection request identifies the information source.

21. The method of claim 20, wherein the step of establishing a connection with an information source responsive to the connection request comprises the step of sending an information request to the information source.

22. The method of claim 21, wherein the connection request conforms to a first communication protocol and the information request conforms to a second communication protocol.

23. The method of claim 22, wherein the second communication protocol is Hypertext Transfer Protocol (HTTP).

24. The method of claim 21, wherein the connection request identifies one or more accepted content types and further comprising the steps of:
   determining whether any of the plurality of transcoders are configured to transcode any further content types into any of the one or more accepted content types; and
   including the one or more accepted content types and the further content types in the information request.

25. The method of claim 18, wherein:
   the connection request identifies one or more accepted content types; and
   the step of transcoding the information content using the retrieved one or more transcoders to create transcoded information content comprises the step of determining if a received content type of the information content may be transcoded into one or more accepted content types.

26. The method of claim 25, wherein the step of determining if a received content type of the information content may be transcoded into one or more accepted content types comprises the steps of:
   determining whether any of the plurality of transcoders are configured to transcode the received content type into the one or more of the accepted content types; and
   selecting a transcoder for transcoding the information content into one of the accepted content types where any of the plurality of transcoders are configured to transcode the received content type into the one or more of the accepted content types.

27. The method of claim 26, further comprising the step of discarding the information content where none of the plurality of transcoders are configured to transcode the received content type into the one or more of the accepted content types.

28. The method of claim 26, further comprising the step of performing a default transcoding operation on the information content where none of the plurality of transcoders are configured to transcode the received content type into the one or more of the accepted content types.

29. The method of claim 28, wherein the step of performing a default transcoding operation on the information content comprises the step of passing the information content.

30. The method of claim 28, wherein the step of performing a default transcoding operation on the information content comprises the step of transcoding the information content into a content type forwarded to the mobile communication device in response to a previous connection request.

31. The method of claim 25, wherein:
   the information content comprises multiple content types; and
   the step of determining if a received content type of the information content may be transcoded into one or more of the accepted content types comprises the step of:
   determining whether any of the transcoders are configured to transcode any of the multiple content types into the one or more of the accepted content types; and
   selecting a respective transcoder for transcoding the information content of each of the multiple content types into one of the accepted content types where any of the transcoders are configured to transcode any of the multiple content types into the one or more of the accepted content types.

32. The method of claim 18, wherein:
   the information content comprises multiple content types; and
   the step of transcoding the information content using the retrieved one or more transcoders to create transcoded information content comprises the step of selecting a respective transcoder for transcoding the information content of each of the multiple content types.

33. The method of claim 18, further comprising the step of mapping the plurality of transcoders to create a plurality of transcoding chains, each transcoding chain associating one or more transcoders to transcode a respective input content type into a respective output content type.

34. The method of claim 33, wherein the connection request identifies one or more accepted content types, and wherein the step of transcoding the information content using the retrieved one or more transcoders to create transcoded information content comprises the steps of:
   determining a received content type of the information content;
   searching the transcoding chains for a respective input content matching the received content type and a respective output content type matching one of the one or more accepted content types; and
   selecting a transcoding chain to transcode the information content.

35. The method of claim 18, wherein the step of transcoding the information content using the retrieved one or more of the plurality of transcoders comprises the steps of:
   transcoding the information content into an intermediate content type; and transcoding the content from the intermediate format into a final content type.

36. The method of claim 18, wherein the connection request identifies one or more accepted content types, and wherein the step of establishing a connection with the information source comprises the steps of:
   searching the plurality of transcoders for a set of transcoders configured to transcode information content into the one or more accepted content types;
   generating a list of respective input content types corresponding to the set of transcoders; and
   sending the list of respective input content types and the one or more accepted content types to the information source.

37. The method of claim 18, wherein the step of transcoding the information content using one or more of the plurality of transcoders comprises the steps of:
   sending the information content to a transcoding system; and
   receiving the transcoded information content from the transcoding system.

38. The method of claim 18, wherein the step of forwarding the transcoded information content to the mobile communication device comprises the step of encrypting the transcoded information content.

39. The method of claim 18, wherein the step of forwarding the transcoded content to the mobile communication device comprises the step of compressing the transcoded content.

40. The method of claim 18, wherein the information source is a private information source configured to operate within a private computer network behind a security firewall.

41. The method of claim 18, further comprising the steps of:
   generating a list of transcoders according to an order of preference; and
   selecting one of the transcoders in the list of transcoders based on the order of preference.

42. The method of claim 18, wherein the input content types and output content types include content types selected from the group consisting of Wireless Markup Language (WML), Hypertext Markup Language (HTML), compiled WML (WMLC) and Extensible Markup Language (XML).

* * * * *

UNITED STATES PATENT AND TRADEMARK OFFICE
CERTIFICATE OF CORRECTION

| | | |
|---|---|---|
| PATENT NO. | : 7,590,759 B2 | Page 1 of 1 |
| APPLICATION NO. | : 10/483457 | |
| DATED | : September 15, 2009 | |
| INVENTOR(S) | : Omar et al. | |

It is certified that error appears in the above-identified patent and that said Letters Patent is hereby corrected as shown below:

Title Page,
(54): Please replace "SYSTEM AND METHOD FOR PROVIDING REMOTE DATA ACCESS AND TRASCODING FOR A MOBILE COMMUNICATION DEVICE" with -- SYSTEM AND METHOD FOR PROVIDING REMOTE DATA ACCESS AND TRANSCODING FOR A MOBILE COMMUNICATION DEVICE --

Column 1: Please replace "SYSTEM AND METHOD FOR PROVIDING REMOTE DATA ACCESS AND TRASCODING FOR A MOBILE COMMUNICATION DEVICE" with -- SYSTEM AND METHOD FOR PROVIDING REMOTE DATA ACCESS AND TRANSCODING FOR A MOBILE COMMUNICATION DEVICE --

Signed and Sealed this

Seventeenth Day of August, 2010

David J. Kappos
*Director of the United States Patent and Trademark Office*